US00RE46392E

(19) United States
(12) Reissued Patent
Jung

(10) Patent Number: US RE46,392 E
(45) Date of Reissued Patent: May 2, 2017

(54) WIRELESS MULTI-CHARGER SYSTEM AND CONTROLLING METHOD THEREOF

(71) Applicant: Intel Corporation, Santa Clara, CA (US)

(72) Inventor: Chun-Kil Jung, Seoul (KR)

(73) Assignee: Intel Corporation, Santa Clara, CA (US)

(21) Appl. No.: 14/457,095

(22) Filed: Aug. 11, 2014

Related U.S. Patent Documents

Reissue of:
(64) Patent No.: 8,102,147
Issued: Jan. 24, 2012
Appl. No.: 12/166,483
Filed: Jul. 2, 2008

U.S. Applications:
(63) Continuation of application No. 13/755,931, filed on Jan. 31, 2013, which is an application for the reissue of Pat. No. 8,102,147.

(30) Foreign Application Priority Data

Nov. 30, 2007 (KR) ..... 10-2007-0123749
Nov. 30, 2007 (KR) ..... 10-2007-0123751
Nov. 30, 2007 (KR) ..... 10-2007-0123752

(51) Int. Cl.
*H02J 7/00* (2006.01)
*H02J 7/02* (2016.01)
(Continued)

(52) U.S. Cl.
CPC ..... *H02J 7/025* (2013.01); *H02J 7/027* (2013.01)

(58) Field of Classification Search
CPC ..... H02J 7/025; H02J 5/005
(Continued)

(56) References Cited

U.S. PATENT DOCUMENTS 5,157,319 A 10/1992 Klontz
5,831,348 A 11/1998 Nishizawa
(Continued)

FOREIGN PATENT DOCUMENTS

JP 64-570006 4/1989
JP 09-019078 1/1997
(Continued)

OTHER PUBLICATIONS

Office Action dated Sep. 25, 2014, issued to the corresponding U.S. Appl. No. 13/755,931.
(Continued)

*Primary Examiner* — Linh M Nguyen
(74) *Attorney, Agent, or Firm* — International IP Law Group, P.L.L.C.

(57) ABSTRACT

Disclosed are a wireless multi-charger system capable of saving the total charging time of a large number of wireless power transmission devices since one wireless multi-power transmission device includes a plurality of the wireless power transmission devices so that a large number of the wireless power transmission devices can be charged with electricity, and preventing the damage of the wireless power transmission devices and the wireless multi-power transmission device although foreign substances are put on charger blocks that are not charged. The wireless multi-charger system (A) according to the present invention includes an external body formed as a wireless charger case 11, wherein the wireless charger case 11 has a wireless charger table 12 formed in an upper surface thereof, wherein the wireless charger table 12 has a plurality of charger blocks 14, each of which includes a primary charging core 13, wherein the full-bridge resonant converter 22 is present in a plural form and coupled respectively to a plurality of the charger blocks 14, wherein a multi-gate driver module 23 is provided to transmit a converted power signal to each of a plurality of
(Continued)

the full-bridge resonant converters 22 under the control of the central controller 21, and wherein a reception signal processor module 24 coupled to a plurality of the charger blocks 14 to process a signal transmitted from the wireless power transmission device 30 and supply the processed signal to the central controller 21 is provided.

14 Claims, 15 Drawing Sheets

(51) Int. Cl.
*H01F 17/00* (2006.01)
*H02M 3/335* (2006.01)

(58) Field of Classification Search
USPC ..... 320/106, 108, 132, 111, 114, 115; 323/363; 363/17
See application file for complete search history.

(56) References Cited

U.S. PATENT DOCUMENTS

| | | | | |
|---|---|---|---|---|
| 6,160,374 | A | 12/2000 | Hayes et al. | |
| 6,184,651 | B1 | 2/2001 | Fernandez | |
| 6,683,438 | B2 * | 1/2004 | Park et al. | 320/108 |
| 7,375,493 | B2 * | 5/2008 | Calhoon et al. | 320/108 |
| 7,956,575 | B2 | 6/2011 | Kawano et al. | |
| 8,102,147 | B2 | 1/2012 | Jung | 320/108 |
| 8,228,025 | B2 | 7/2012 | Ho et al. | 320/108 |
| 8,330,414 | B2 * | 12/2012 | Takahashi et al. | 320/108 |
| 2004/0145342 | A1 | 7/2004 | Lyon | |
| 2005/0068019 | A1 | 3/2005 | Nakamura et al. | |
| 2005/0127868 | A1 | 6/2005 | Calhoon et al. | 320/108 |
| 2006/0226805 | A1 * | 10/2006 | Yu | 320/107 |
| 2007/0139000 | A1 | 6/2007 | Kozuma et al. | 320/108 |
| 2008/0094027 | A1 | 4/2008 | Cho | 320/108 |
| 2008/0197802 | A1 | 8/2008 | Onishi et al. | 320/108 |
| 2009/0033280 | A1 | 2/2009 | Choi et al. | 320/108 |
| 2009/0096413 | A1 * | 4/2009 | Partovi et al. | 320/108 |
| 2013/0175983 | A1 | 7/2013 | Partovi et al. | 320/108 |

FOREIGN PATENT DOCUMENTS

| | | | |
|---|---|---|---|
| JP | 2003-224937 | A | 8/2003 |
| JP | 2004-222457 | | 8/2004 |
| JP | 2005-006440 | | 1/2005 |
| JP | 2006-314181 | | 11/2006 |
| JP | 2007-295677 | | 11/2007 |
| KR | 100554889 | | 3/2005 |
| KR | 100554889 | B1 | 3/2005 |
| KR | 10200554816 | | 6/2005 |
| KR | 10200554816 | A | 6/2005 |
| KR | 1020070014804 | | 2/2007 |
| KR | 1020070014804 | A | 2/2007 |
| WO | WO 2006/001557 | | 1/2006 |
| WO | WO 2006/101285 | A1 | 9/2006 |
| WO | WO 2007/089086 | | 9/2007 |

OTHER PUBLICATIONS

U.S. Appl. No. 12/166,483, filed Jul. 2, 2008, Chun-Kil Jung, Spacon Co., Ltd.
U.S. Appl. No. 13/755,931, filed Jan. 31, 2013, Chun-Kil Jung, Spacon Co., Ltd.
U.S. Appl. No. 13/875,748, filed May 2, 2013, Chun-Kil Jung, Spacon Co., Ltd.
Office Action issued by the USPTO on Sep. 12, 2013, for the corresponding U.S. Appl. No. 13/755,931.
Office Action issued by the USPTO on Sep. 12, 2013, for the corresponding U.S. Appl. No. 13/875,748.
European Search Report issued by the EPO on Aug. 27, 2014, for the corresponding EP Patent Application No. 13186429.0.
European Search Report, EP No. 08159822, mailed on Jan. 28, 2013, 2 pages.

* cited by examiner

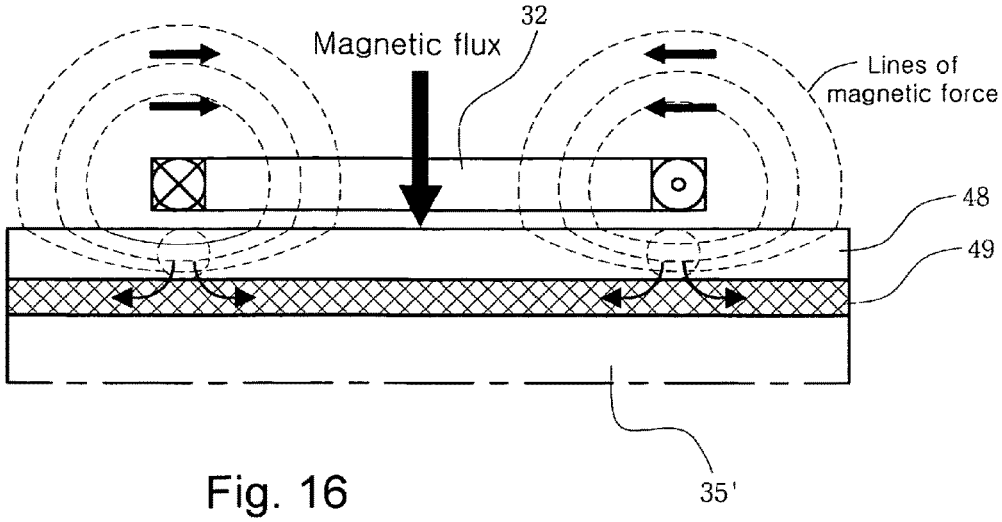
Fig. 16
Fig. 17
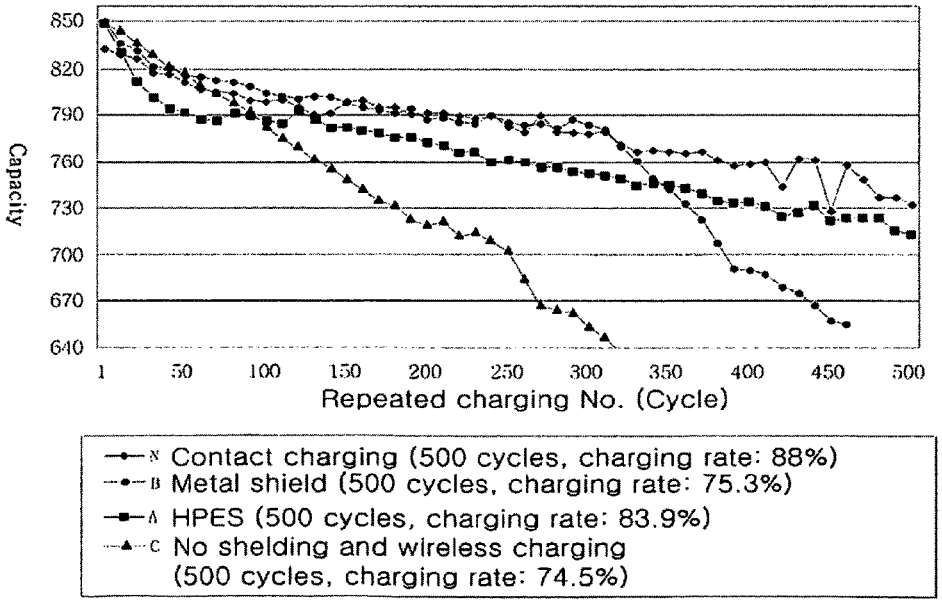

WIRELESS MULTI-CHARGER SYSTEM AND CONTROLLING METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*Notice: More than one reissue application has been filed for the reissue of U.S. Pat. No. 8,102,147; the reissue applications are application Ser. No. 14/457,095 (the present application), Ser. Nos. 13/755,931, and 15/197,171, the present application being a continuation reissue application of U.S. patent application Ser. No. 13/755,931, filed Jan. 31, 2013, which is a reissue application of U.S. patent application Ser. No. 12/166,483, filed Jul. 2, 2008, now patented as U.S. Pat. No. 8,102,147, issued on Jan. 24, 2012, which claims foreign priority of Korean Application Nos. 10-2007-01237 49 filed Nov. 30, 2007, 10-2007-0123751, filed Nov. 30, 2007 and 10-2007-0123752 filed Nov. 30, 2007, all in the Korean Intellectual Property Office.*

TECHNICAL FIELD

The present invention relates to a, and more particularly to a wireless charger system, and more particularly to a wireless multi-charger system capable of saving the total charging time of a large number of wireless power transmission devices since one wireless multi-power transmission device includes a plurality of the wireless power transmission devices so that a large number of the wireless power transmission devices can be charged with electricity, and preventing the damage of the wireless power transmission devices and the wireless multi-power transmission device although foreign substances are put on charger blocks that are not charged.

BACKGROUND ART

Generally, since portable wireless power transmission devices such as mobile phones, PDA, PMP, DMB terminals, MP3 or notebook computers are not supplied with a conventional household power source since users use the portable wireless power transmission devices while moving around. Therefore, it is necessary to install disposable batteries or rechargeable batteries in the portable wireless power transmission devices.

However, as a charger for charging electricity in a battery pack for these wireless power transmission devices, there is a terminal supply system in which electricity is received from a conventional power source and a power source is supplied to a battery pack via power supply lines and a power supply terminal. However, where the battery pack is attached/detached to/from the charger when a power source is supplied to this terminal supply system, an instant discharge phenomenon occurs due to the different potential difference of terminals disposed in both sides of the battery pack. Therefore, the battery pack has an increasing possibility to start fires as foreign substances are accumulated in the terminals. Also, since the terminals are directly exposed to the air, the life span and performances of the charger and the battery pack may be deteriorated, for example, due to the spontaneous discharge in the presence of moisture or dusts.

In order to solve these problems regarding the terminal supply system, there has been developed a wireless charger. That is to say, this conventional wireless charger is charged by a secondary coil of the battery when a portable terminal block having a battery pack mounted inside is disposed upwardly in a primary coil of wireless charger. That is to say, an induced electromotive force is generated in the secondary coil by the magnetic field formed in the primary coil, and electricity induced from the induced electromotive force is charged in the secondary coil.

However, these conventional wireless chargers have no practical use since it is possible only to supply a power to a portable terminal block, but they have difficulty in use for other applications.

Furthermore, the wireless charger may be damaged due to the increased loss of power in the primary coil with the changes in the magnetic field when metals are disposed adjacent to the magnetic field generated in the primary coil.

DISCLOSURE

Technical Problem

Accordingly, the present invention is designed to solve the above problems, and therefore it is an object of the present invention to provide a wireless multi-charger system capable of saving the total charging time of a large number of wireless power transmission devices since one wireless multi-power transmission device includes a plurality of the wireless power transmission devices so that a large number of the wireless power transmission devices can be charged with electricity.

Also, it is another object of the present invention to provide a wireless multi-charger system capable of preventing the damage of the wireless power transmission devices and the wireless multi-power transmission device by stopping the power transmission when foreign substances such as metals are put on charger blocks that are not charged.

Furthermore, it is still another object of the present invention to provide a wireless multi-charger system capable of improving the charging efficiency by stably performing a continuous charging operation although the current wireless power transmission device that is on charge is touched to charge a new wireless power transmission device.

Technical Solution

In order to accomplish the above object, one embodiment of the present invention provides a wireless multi-charger system (A) including a wireless multi-power transmission device 10 for transmitting a power signal to a wireless power transmission device 30 in a wireless manner, wherein the wireless multi-power transmission device 10 include a wireless charger case 11 formed as an external body, the wireless charger case 11 having a full-bridge resonant converter 22 and a central controller 21 mounted thereinside to transmit a power signal to the wireless power transmission device 30 in a wireless manner, wherein the wireless charger case 11 has a wireless charger table 12 formed in an upper surface thereof, wherein the wireless charger table 12 has a plurality of charger blocks 14, each of which includes a primary charging core 13, wherein the full-bridge resonant converter 22 is present in a plural form and coupled respectively to a plurality of the charger blocks 14, wherein a multi-gate driver module 23 is provided to transmit a converted power signal to each of a plurality of the full-bridge resonant converters 22 under the control of the central controller 21, and wherein a reception signal processor module 24 coupled to a plurality of the charger blocks 14 to process a signal transmitted from the wireless power transmission device 30 and supply the processed signal to the central controller 21 is provided.

In this case, the wireless charger case 11 may have a power-on/off switch 151; an input panel 152 for inputting a signal; and a LCD panel 153 and a charging LED 154 for displaying a charging state of the wireless charger table 12 and a plurality of the charger blocks 14 and the wireless power transmission device 30, all of which are formed in the front thereof, and may include a power supply unit 25 formed thereinside.

Also, the central controller 21 may includes a power supply block 211 coupled to the power supply unit 25 to supply a power source of the wireless multi-power transmission device 10; a signal output block 212 for outputting a display signal into the LCD panel 153 and the charging LED 154; a gate output signal processor block 213 coupled to the multi-gate driver module 23 to transmit a power signal transmitted from the primary charging core 13; a received signal processor block 214 coupled to one side of the primary charging core 13 for processing a signal transmitted from the reception signal processor module 24 for processing a signal transmitted from the wireless power transmission device 30; and a main controller 210 for controlling the power supply block 211, the signal output block 212, the gate output signal processor block 213 and the received signal processor block 214.

In addition, the central controller 21 may control the request for data information on charging capacity to the wireless device 30, receive data of the information on charging capacity and data of the power signal voltage transmitted from the wireless device 30 to determine voltage data of the transmitted power signal, perform an arithmetic operation on the frequency of the power signal to compensate for a transmitted power relative to the voltage data of the power signal of the determined wireless device 30, and control the transmission of the power signal as the compensated frequency to transmit a compensated power signal to the wireless device 30.

Also, the wireless power transmission device 30 may include a secondary charging core 32 for transmitting an induced electric current from the magnetic field to correspond to the primary charging core 13 of the wireless multi-power transmission device 10; a rectifier block 33 coupled to the secondary charging core 32 to rectify the induced electric current; a smoothing filter block 34 coupled to the rectifier block 33 to filter an electric current; a charger IC block 36 coupled to the smoothing filter block 34 to charge a power source in the battery cell 35; a protection circuit module block 37 provided between the charger IC block 36 and the battery cell 35 to detect an electric current charged in the battery cell 35 and transmit information on a charging state of the battery cell 35 to the power receiver controller 39; a positive-voltage regulator block 38 provided to supply a power source to the power receiver controller 39; and a power receiver controller 39 for controlling the rectifier block 33, the smoothing filter block 34, the charger IC block 36, the protection circuit module block 37 and the positive-voltage regulator block 38.

In addition, the power receiver controller 39 may include a power signal processor block 393 coupled to the smoothing Filter block 34 to process a transmission signal for the data information on the power signal received from the wireless power transmission device 10; a charge signal processor block 394 coupled to the charger IC block 36 and the protection circuit module block 37 to process a transmission signal for the data information on the charging capacity and charging state of the battery cell 35; a signal processor block 392 for processing information on the charging capacity and data information on the native ID that are transmitted to the wireless multi-power transmission device 10 under the control of the device controller 390; a device memory unit 391 for storing data information on the native ID, temporally storing the data information of the charging capacity and the charging state transmitted from the protection circuit module block 37 and the charger IC block 36 and storing the data transmitted from the wireless multi-power transmission device 10; and a device controller 390.

Additionally, the main controller 210 of the wireless multi-power transmission device 10 may control the transmission of a native code signal for respective charger blocks 14 in addition to the charge power signal to the charger blocks that are on charge, the device controller 390 may analyze the native code signal for the corresponding charger block 14 transmitted from the wireless multi-power transmission device 10, and the device memory unit 391 stores a data value of the native code signal for the corresponding charger block 14 transmitted from the device controller 390.

Furthermore, the device controller 390 may control the transmission of a data value to the wireless multi-power transmission device 10, the data value including a voltage value of the power signal received for the received request signal from the wireless multi-power transmission device 10.

In order to accomplish the above object, another embodiment of the present invention provides a method for controlling a wireless multi-charger system (A) as defined in any one of claims 1 to 4, including:

1) transmitting a power signal via the primary charging core 13 from wireless multi-power transmission device 10 of the wireless multi-charger system (A) in every cycle, the power signal including a call signal for calling a native ID value of the wireless power transmission device 30, and waiting for the receipt of a response signal for the power signal (S01);

2) determining the presence of an object by checking a detected detection signal according to the load modulation in a primary charging core 13 of one of the charger blocks 14 and determining whether the detected detection signal is a normal signal (S02);

3) determining whether a native ID signal of the wireless power transmission device 30 is received by analyzing the detected reception signal (S03);

4) transmitting a fully charged transmission power from the primary charging core 13 of the corresponding charger block 14 via the multi-gate driver module 23 when the received native ID signal is determined to be a native ID transmitted from the wireless power transmission device 30 (S04);

5) requesting information on the charging state to the wireless power transmission device 30 and adjusting a charging level according to the charging information of the wireless power transmission device 30 (S05);

6) displaying a fully charged state in an LCD panel 153 or a charging LED 154 corresponding to the corresponding charger block 14 and stopping a charging operation when the information on the fully charged state is received from the wireless power transmission device 30 (S06).

In this case, the object detection step (S02) may include: converting a plurality of the charger blocks 14 into a foreign substance detection mode when a detection signal detected through the corresponding primary charging core 13 and the reception signal processor module 24 according to the load modulation generated by objects is not a normal signal, displays a foreign substance error in the LCD panel 153 or charging LED 154 when the detected foreign substance is a metal or electronic equipment, and stops a charging operation on the corresponding charger block 14 (S021).

Also, the charging control step (S05) may include:

requesting data information on the charging capacity to the wireless power transmission device 30;

receiving data information on the charging capacity and the voltage data of the power signal transmitted from the wireless power transmission device 30;

determining the voltage data of the power signal transmitted from the wireless power transmission device 30;

performing an arithmetic operation on a frequency of the power signal to compensate for the transmitted power for the voltage data of the power signal transmitted from the wireless power transmission device 30;

transmitting a power signal as a compensated frequency to transmit a compensated power signal to the wireless power transmission device 30.

Advantageous Effects

As described above, the wireless multi-charger system according to the present invention may be useful to save the total charging time of a large number of wireless power transmission devices since one wireless multi-power transmission device includes a plurality of the wireless power transmission devices so that a large number of the wireless power transmission devices can be charged with electricity.

Also, the wireless multi-charger system according to the present invention may be useful to prevent the damage of the wireless power transmission devices and the wireless multi-power transmission device by stopping the power transmission in the corresponding charger block when foreign substances are put on charger blocks that are not charged.

Furthermore, the wireless multi-charger system according to the present invention may be useful to improve the charging efficiency by stably performing a continuous charging operation although the current wireless power transmission device that is on charge is touched to charge a new wireless power transmission device.

DESCRIPTION OF THE DRAWINGS

FIGS. 15 and 16 are an exploded perspective view and a side cross-sectional view showing the wireless power transmission device according to the present invention, respectively.

FIG. 17 is a graphic diagram illustrating the efficiencies of the wireless power transmission device according to the present invention in the repeated charging/discharging experiments.

BEST MODE

Hereinafter, preferred embodiment of the present invention will be described in detail with reference to the accompanying drawings.

Figure 1:
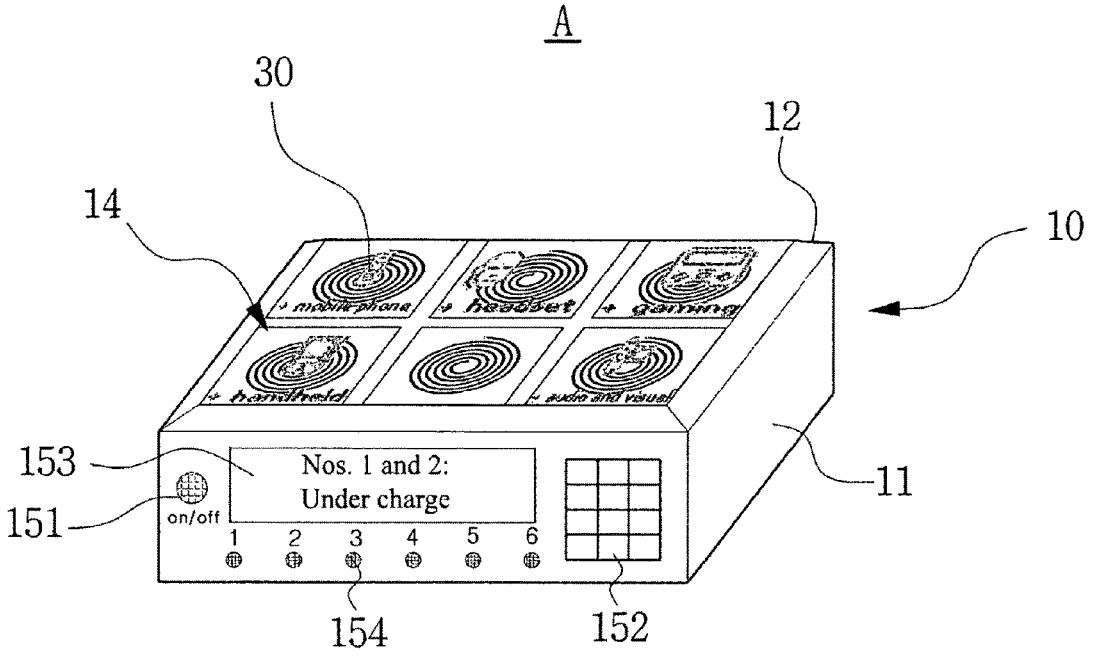
FIG. 1 is a perspective view showing a wireless multi-power transmission device of a wireless multi-charger system according to the present invention.
Figure 2:
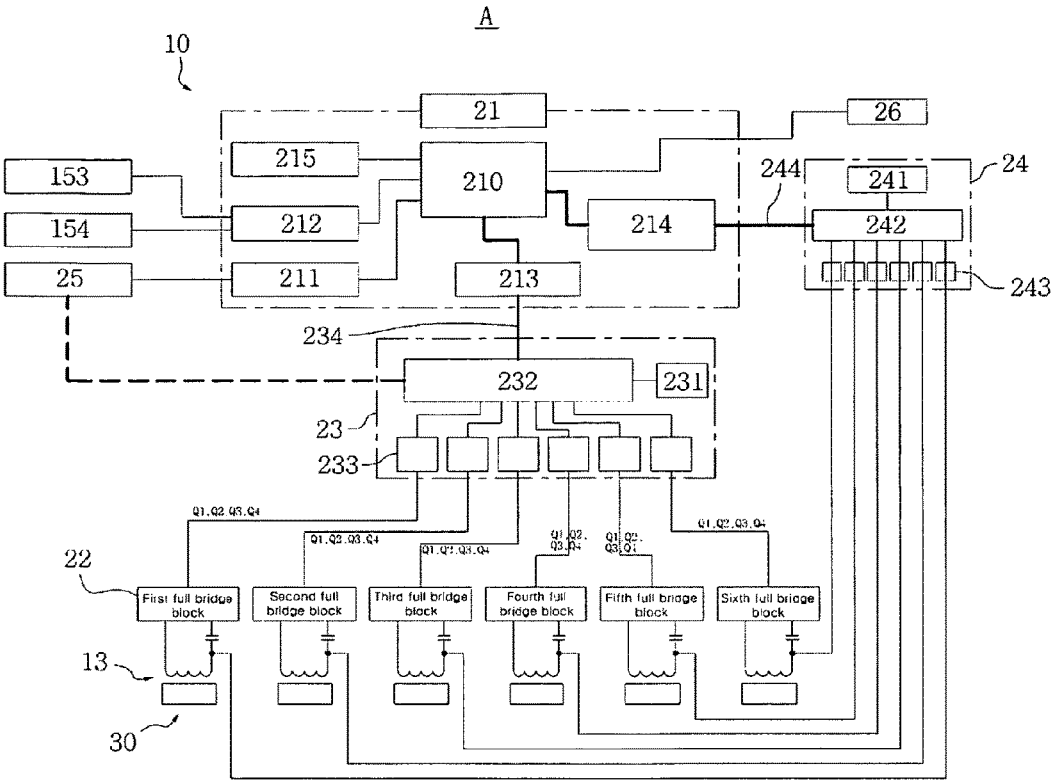
FIG. 2 is a control block view showing the wireless multi-power transmission device of the wireless multi-charger system according to the present invention.
Figure 3:
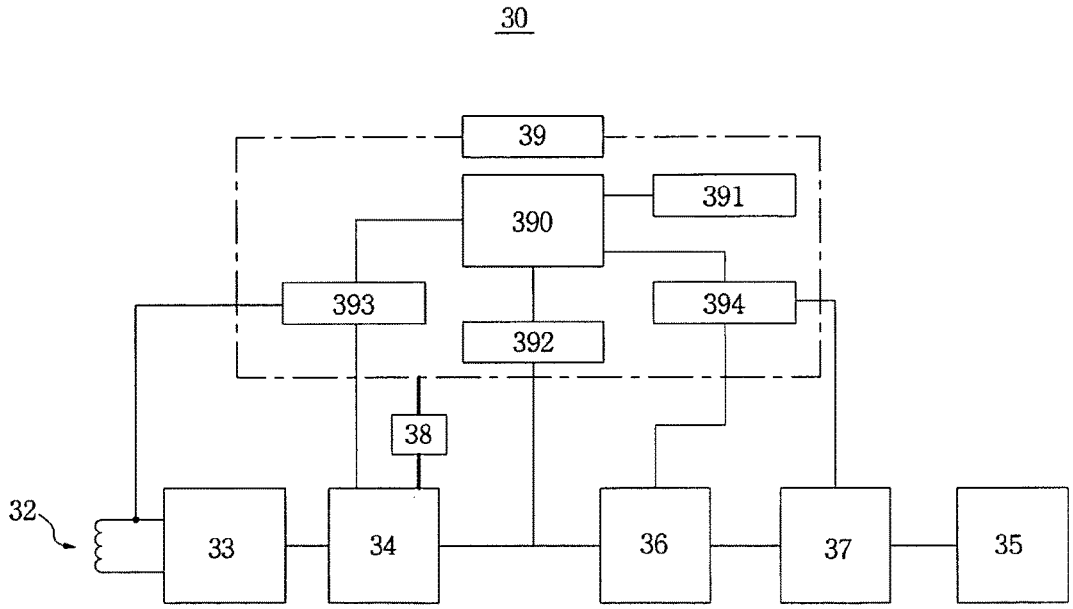
FIG. 3 is block view showing the wireless multi-power transmission device of the wireless multi-charger system according to the present invention.
Figure 4:
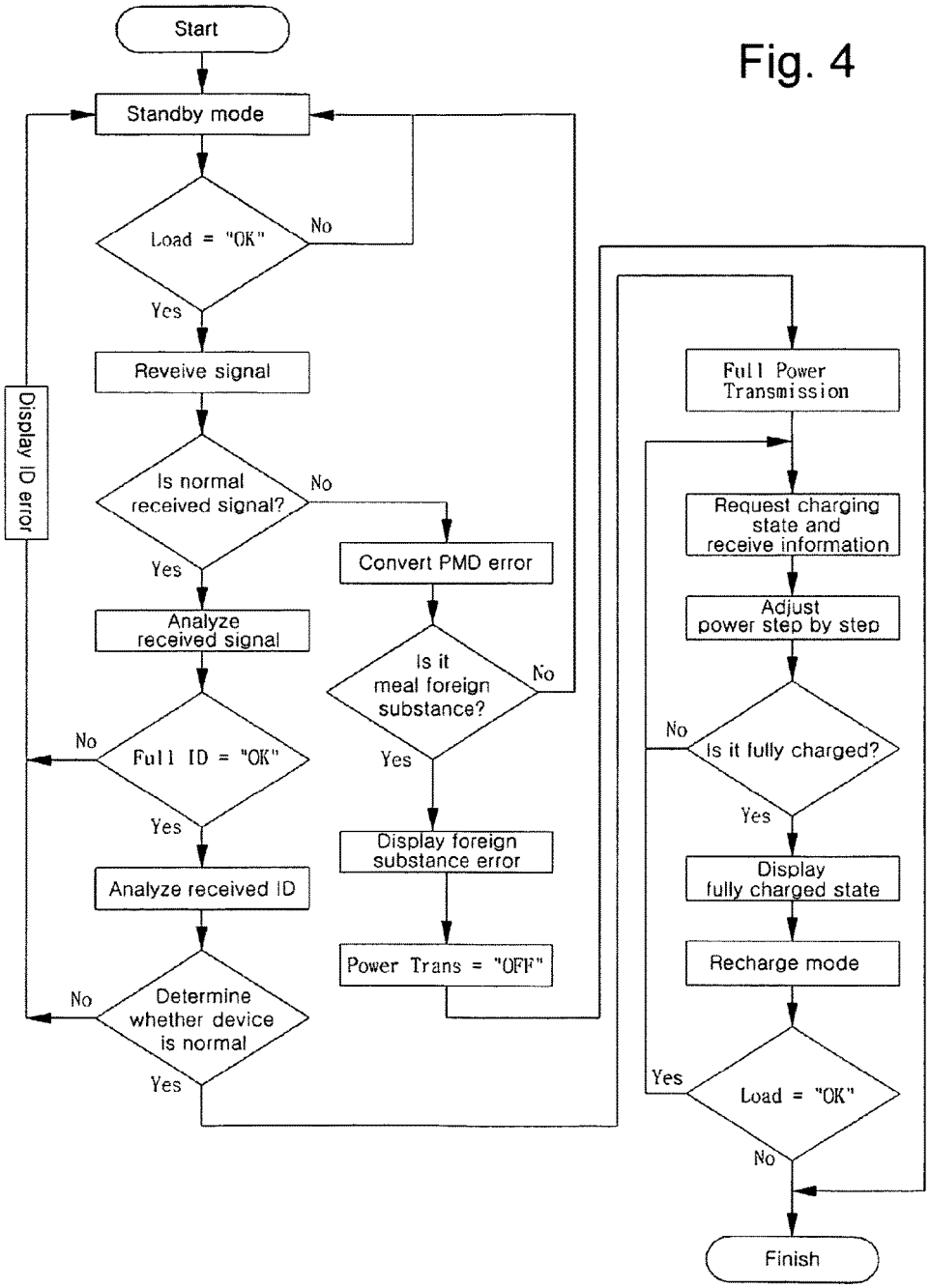
FIG. 4 is a control flowchart showing the wireless multi-power transmission device of the wireless multi-charger system according to the present invention.
Figure 5:
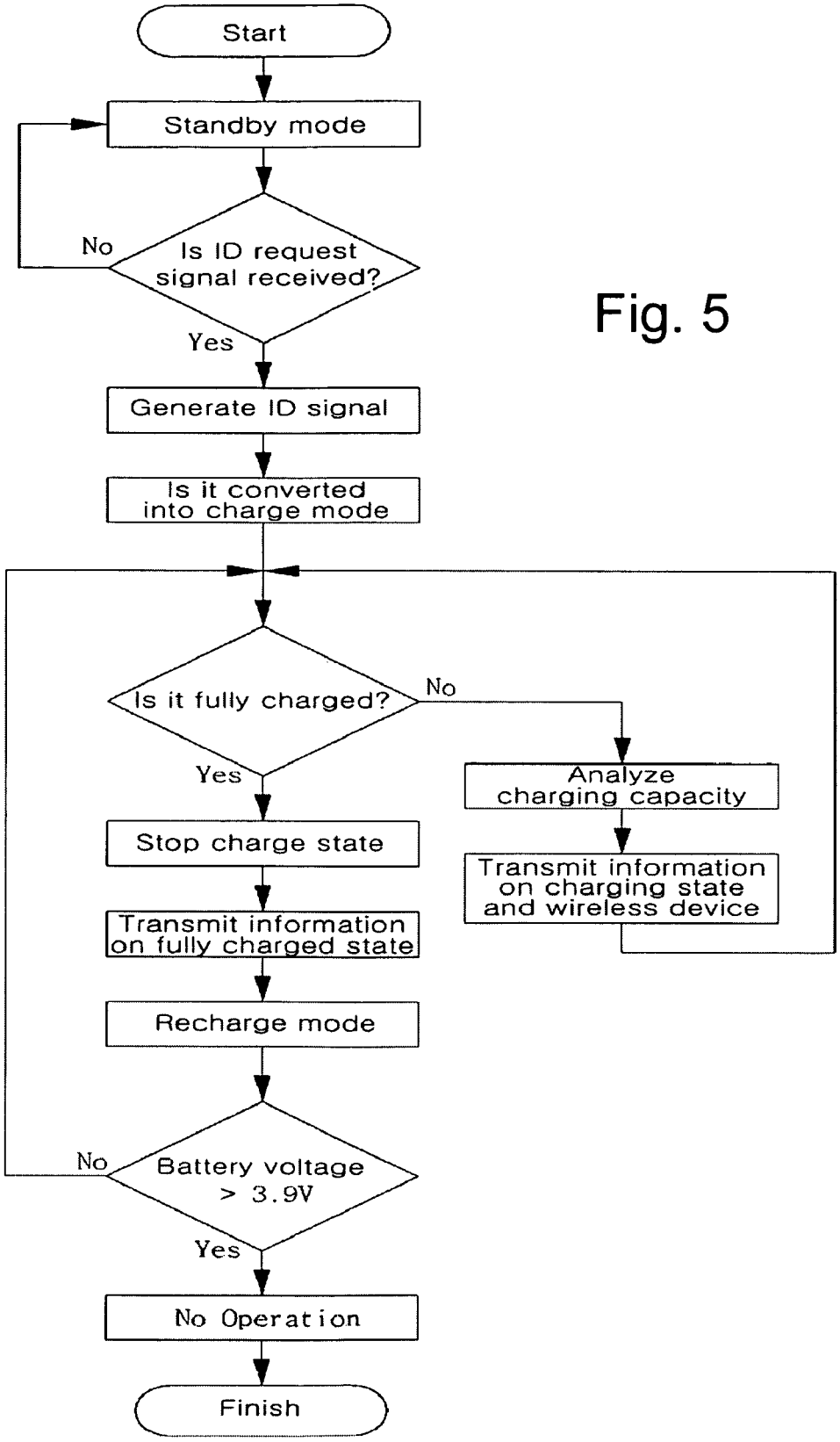
FIG. 5 is a control flowchart showing the wireless multi-power transmission device of the wireless multi-charger system according to the present invention.
Figure 6:
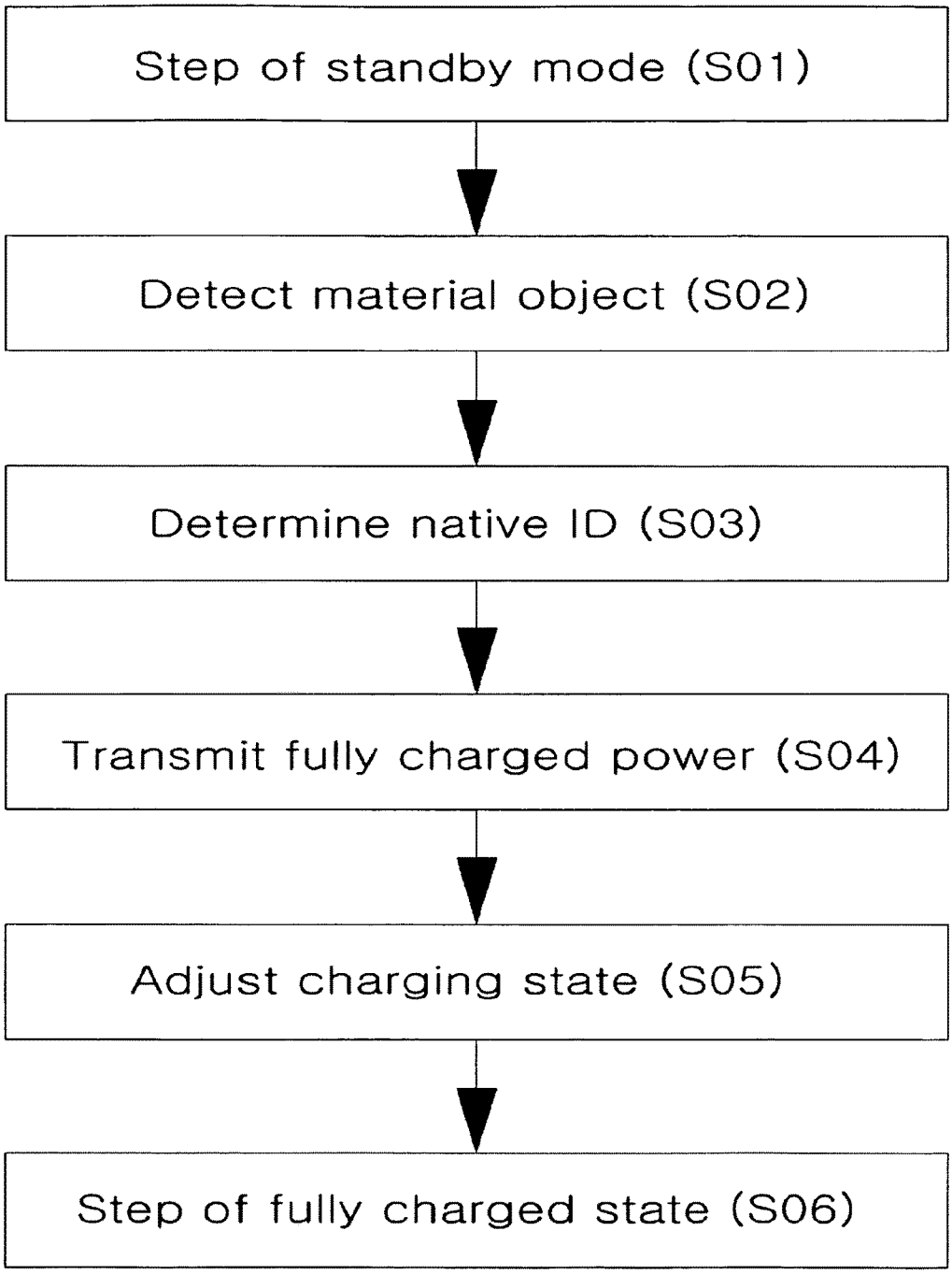
FIG. 6 is a control block view showing a method for controlling a wireless multi-charger system according to the present invention.

FIG. 1 is a perspective view showing a wireless multi-power transmission device of a wireless multi-charger system according to the present invention, FIG. 2 is a control block view showing the wireless multi-power transmission device of the wireless multi-charger system according to the present invention, FIG. 3 is block view showing the wireless multi-power transmission device of the wireless multi-charger system according to the present invention, FIG. 4 is a control flowchart showing the wireless multi-power transmission device of the wireless multi-charger system according to the present invention, FIG. 5 is a control flowchart showing the wireless multi-power transmission device of the wireless multi-charger system according to the present invention, and FIG. 6 is a control block view showing a method for controlling a wireless multi-charger system according to the present invention.

FIGS. 7 to 12 are graphic diagrams illustrating the efficiencies to the power control in the wireless multi-charger system according to the present invention. FIGS. 7 to 12 shows the power control when a wireless power transmission device 30 moves relative to the wireless multi-power transmission device 10.

Figure 13:
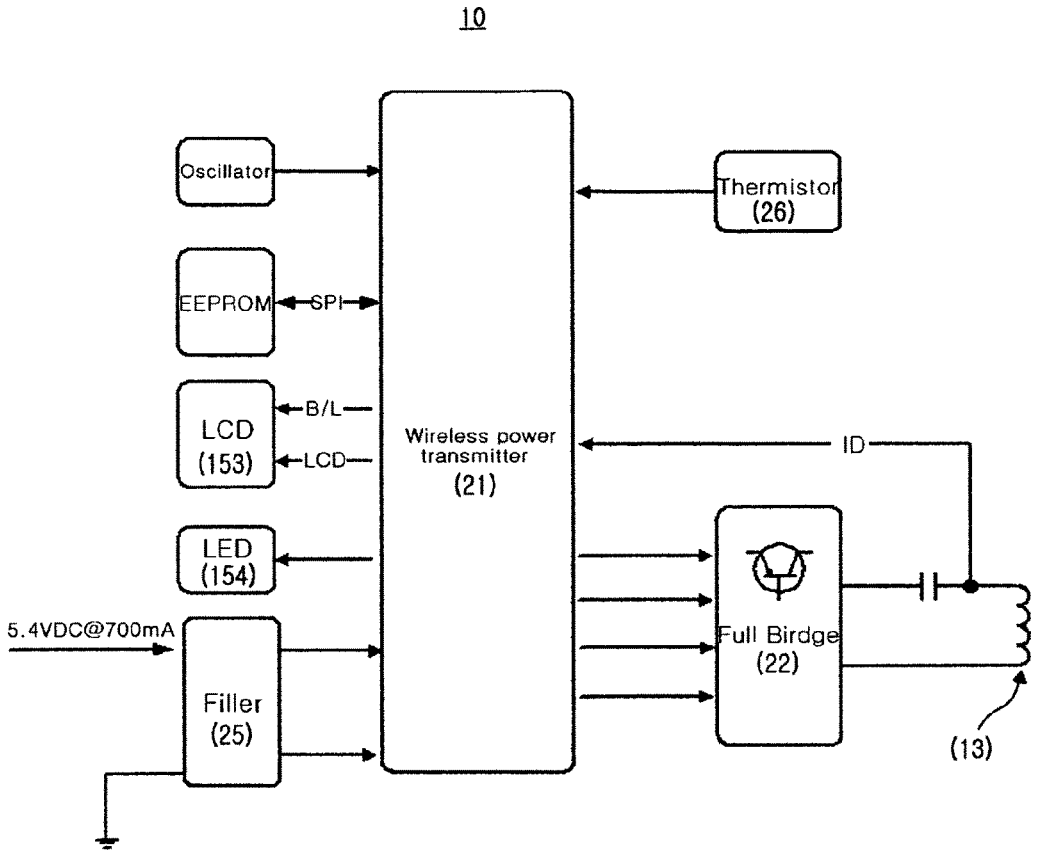
FIG. 13 is configuration view showing a wireless power transmission device according to one exemplary embodiment of the present invention.
Figure 14:
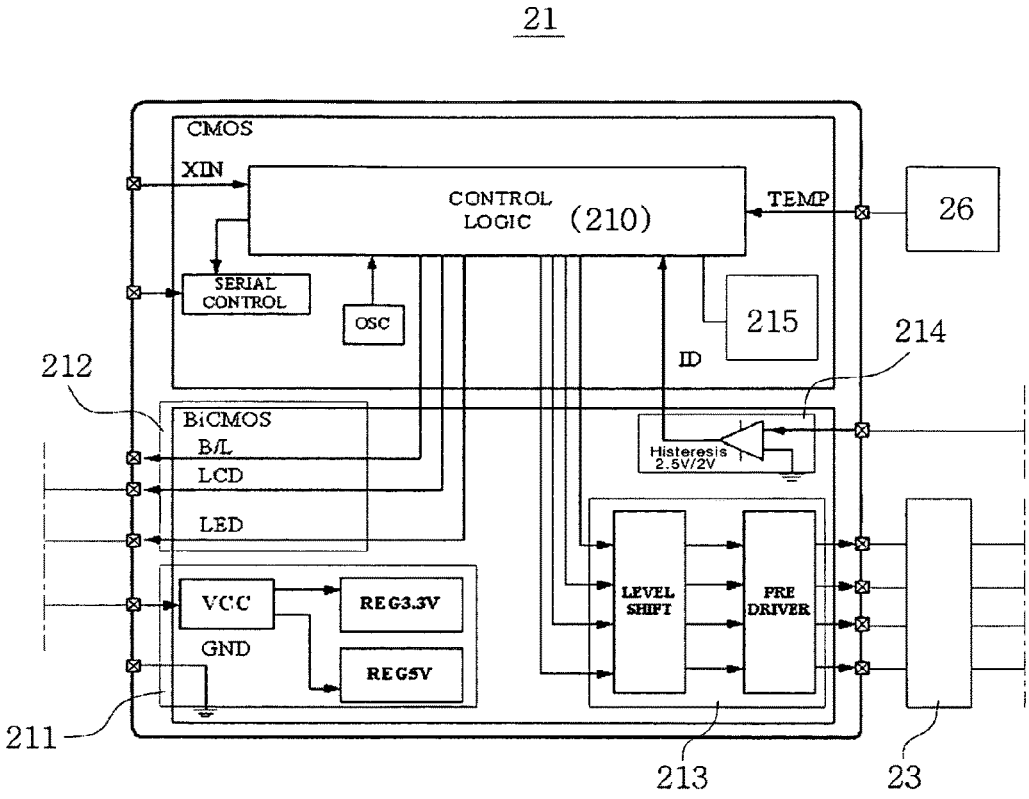
FIG. 14 is configuration view showing a central controller of the wireless power transmission device according to one exemplary embodiment of the present invention.

FIG. 13 is configuration view showing a wireless power transmission device according to one exemplary embodiment of the present invention, and FIG. 14 is configuration view showing a central controller of the wireless power transmission device according to one exemplary embodiment of the present invention.

Figure 15:
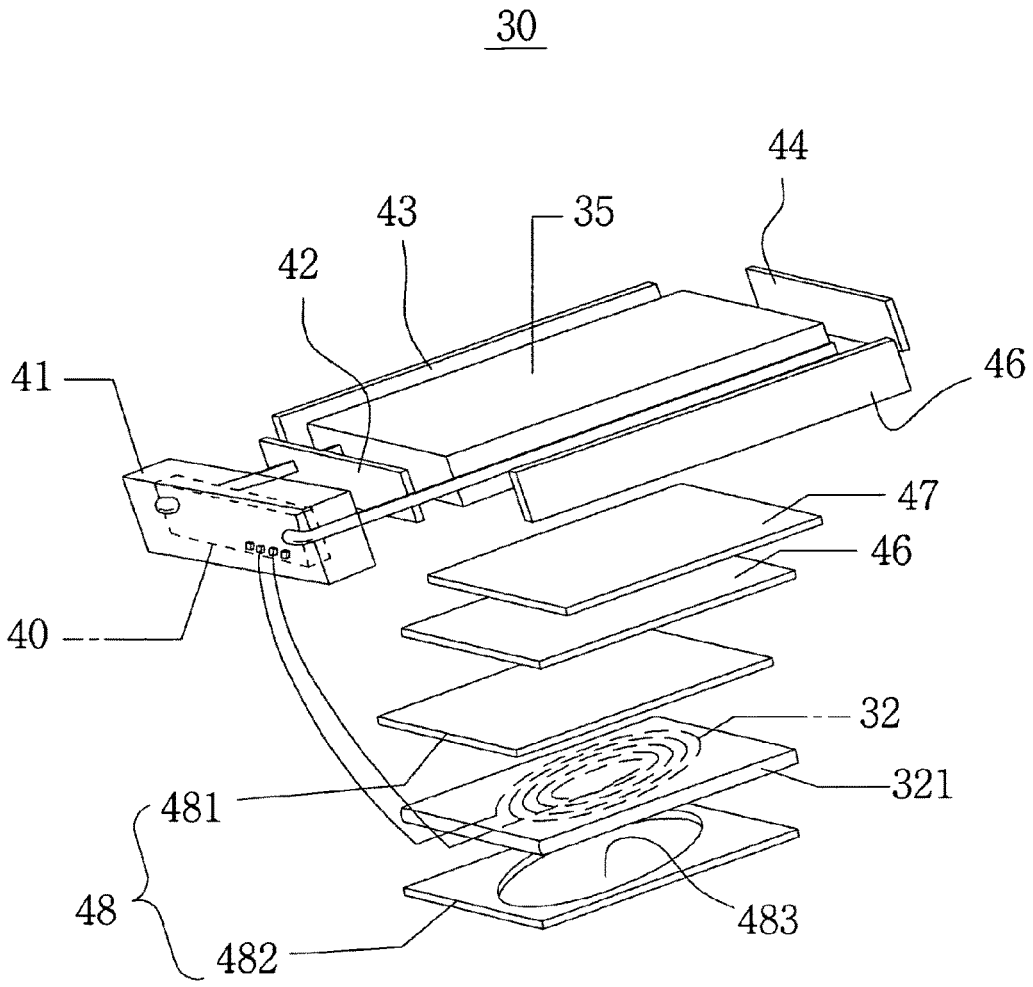
Figure 18:
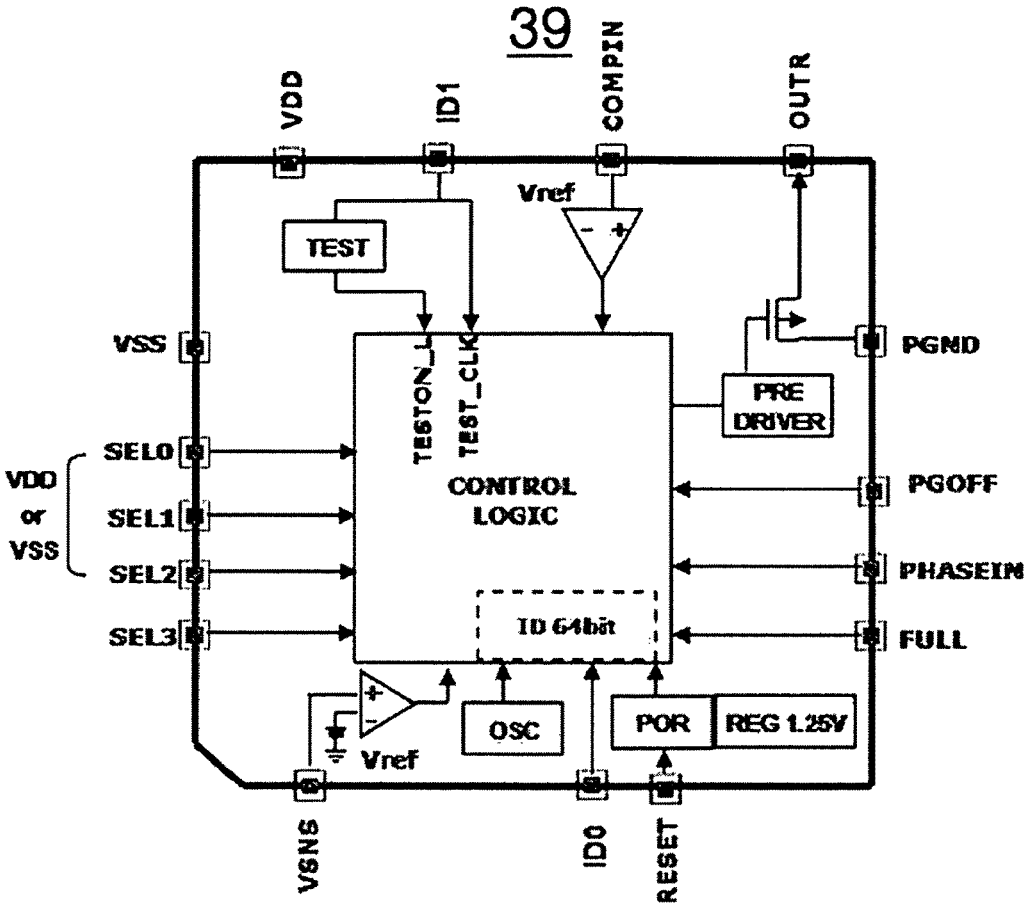
FIG. 18 is a circuit view showing a wireless device control module of the wireless power transmission device according to one exemplary embodiment of the present invention.
Figure 19:
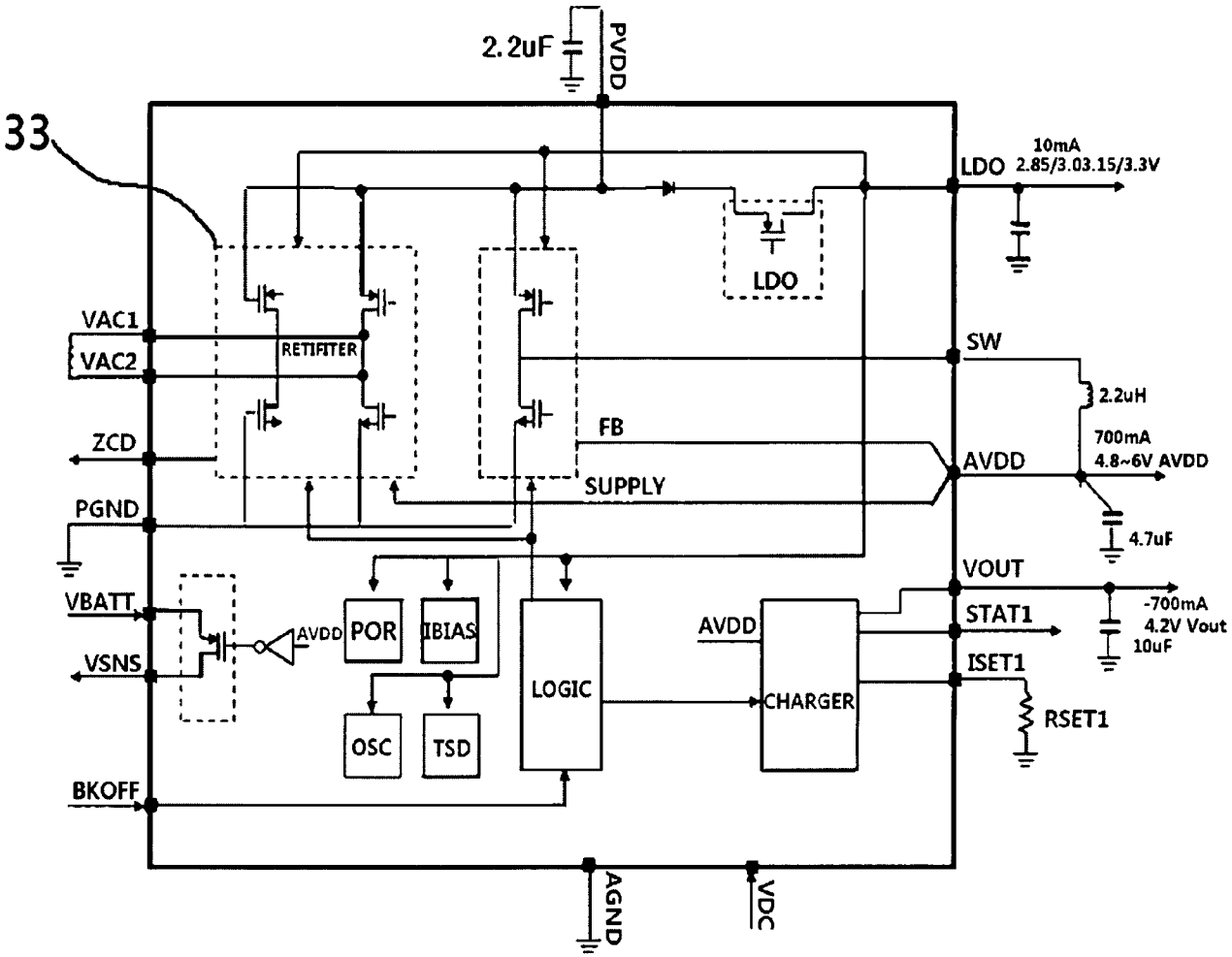
FIG. 19 is a circuit view showing a rectifier member of the wireless power transmission device according to one exemplary embodiment of the present invention.

FIGS. 15 and 16 are an exploded perspective view and a side cross-sectional view showing the wireless power transmission device according to the present invention, respectively, FIG. 17 is a graphic diagram illustrating the efficiencies of the wireless power transmission device according to the present invention in the repeated charging/discharging experiments, FIG. 18 is a circuit view showing a wireless device control module of the wireless power transmission device according to one exemplary embodiment of the present invention, and FIG. 19 is a circuit view showing a rectifier member of the wireless power transmission device according to one exemplary embodiment of the present invention.

That is to say, the wireless multi-charger system (A) according to the present invention includes a wireless multi-power transmission device 10 for transmitting a power signal to a wireless power transmission device 30 in a wireless manner, as shown in FIGS. 1 to 19.

As shown above in FIG. 1, the wireless multi-power transmission device 10 has a wireless charger case 11 formed as an external body. In this case, a full-bridge resonant converter 22 and a central controller 21 for transmitting a power signal to the wireless power transmission device 30 in a wireless manner are mounted inside the wireless charger case 11.

Also, a wireless charger table 12 is provided in an upper surface of the wireless charger case 11. In this case, a plurality of charger blocks 14 each having a primary charging core 13 are formed in the wireless charger table 12.

Therefore, the full-bridge resonant converter 22 is provided in a plural form and coupled respectively to a plurality of the charger blocks 14. And, a multi-gate driver module 23 is provided to transmit a converted power signal to each of a plurality of the full-bridge resonant converters 22 under the control of the central controller 21. Also, provided is a reception signal processor module 24 coupled to a plurality of the charger blocks 14 to process a signal transmitted from the wireless power transmission device 30 and supply the processed signal to the central controller 21.

Also, the wireless charger case 11 has a power-on/off switch 151; an input panel 152 for inputting a signal; and a LCD panel 153 and a charging LED 154 for displaying a charging state of the wireless charger table 12 and a plurality of the charger blocks 14 and the wireless power transmission device 30, all of which are formed in the front thereof, and includes a power supply unit 25 formed thereinside.

Therefore, the portable wireless power transmission device 30 such as mobile phones, PDA, PMP, DMB terminals, MP3 or notebook computers is put on a plurality of charger blocks 14 formed on the wireless charger case 11, as shown in FIG. 1. Therefore, the power transmission device 10 detects the wireless power transmission device 30 and performs a charging operation when the portable wireless power transmission device 30 is put on a plurality of charger blocks 14.

Also, referring to the configuration of the central controller 21 for controlling the charging operation in the wireless multi-power transmission device 10, the central controller 21 includes a power supply block 211 coupled to the power supply unit 25 to supply a power source of the wireless multi-power transmission device 10; a signal output block 212 for outputting a display signal into the LCD panel 153 and the charging LED 154; a gate output signal processor block 213 coupled to the multi-gate driver module 23 to transmit a power signal transmitted from the primary charging core 13; a received signal processor block 214 coupled to one side of the primary charging core 13 for processing a signal transmitted from the reception signal processor module 24 for processing a signal transmitted from the wireless power transmission device 30; and a main controller 210 for controlling the power supply block 211, the signal output block 212, the gate output signal processor block 213 and the received signal processor block 214, as shown in FIG. 2.

In addition, referring to the major configuration of the wireless power transmission device 30 that is charged while being put on a plurality of the charger blocks 14 formed in the wireless charger case 11 of the wireless multi-power transmission device 10, the wireless power transmission device 30 includes a secondary charging core 32 for transmitting an induced electric current to correspond to the primary charging core 13 of the wireless multi-power transmission device 10; a rectifier block 33 coupled to the secondary charging core 32 to rectify the induced electric current; a smoothing filter block 34 coupled to the rectifier block 33 to filter an electric current; a charger IC block 36 coupled to the smoothing filter block 34 to charge a power source in the battery cell 35; a protection circuit module block 37 (PCM) provided between the charger IC block 36 and the battery cell 35 to detect an electric current charged in the battery cell 35 and transmit information on a charging state of the battery cell 35 to the power receiver controller 39, and detecting overvoltage, under voltage, electric current and shortcut of a battery; a positive-voltage regulator block 38 provided to supply a power source to the power receiver controller 39; and a power receiver controller 39 for controlling the rectifier block 33, the smoothing filter block 34, the charger IC block 36, the protection circuit module block 37 and the positive-voltage regulator block 38 and monitoring the ID generation and the charging state, as shown in FIG. 3.

Also, the power receiver controller 39 includes a power signal processor block 393 coupled to the smoothing filter block 34 to process a transmission signal for the data information on the power signal received from the wireless power transmission device 10; a charge signal processor block 394 coupled to the charger IC block 36 and the protection circuit block 37 to process a transmission signal for the data information on the charging capacity and charging state of the battery cell 35; a signal processor block 392 for processing information on the charging capacity and data information on the native ID that are transmitted to the wireless multi-power transmission device 10 under the control of the device controller 390; a device memory unit 391 for storing data information on the native ID, temporally storing the data information of the charging capacity and the charging state transmitted from the protection circuit block 37 and the charger IC block 36 and storing the data transmitted from the wireless multi-power transmission device 10; and a device controller 390.

The wireless multi-charger system (A) according to the present invention, as configured thus, has an advantage that several wireless power transmission devices 30 may be charged only one time since the wireless charger table 12 formed on the wireless multi-power transmission device 10 is formed of a plurality of the charger blocks 14.

The charging operation of the wireless multi-charger system (A) according to the present invention is described in more detail, as follows.

1) First, a standby mode step (S01) in which a power signal is transmitted in every cycle via gate signal paths 234 of the gate output signal processor block 213—the multi-gate driver module 23—the full-bridge resonant converter 22—the corresponding primary charging cores 13 of respective charger blocks 14 is performed under the control of the central controller 21 in the wireless multi-power transmission device 10 of the wireless multi-charger system (A). As described above, in the standby mode step (S01), a power signal is transmitted via the primary charging core 13 in every cycle, the power signal including a call signal for calling a native ID value of the wireless power transmission device 30, and waiting for the receipt of a response signal for the power signal.

2) Then, while a call signal for a native ID value is transmitted and the receipt of a response signal for the call signal is waited for in the standby mode step (S01), an object detection step (S02) of receiving a detection signal according to the load modulation is performed in the primary charging core 13 of one of the charger blocks 14. When any object is detected as described above, the portable wireless power transmission devices 30, such as mobile phones, PDA, PMP, DMB terminals, MP3 or notebook computers, that may be charged in a wireless manner; and conventional electronic equipments that may not be charged in a wireless manner may be put on the charger blocks 14. Therefore, the wireless multi-power transmission device 10 receives a signal according to the load modulation as a detection signal, the load modulation being generated by any of the objects as listed above, and simultaneously determines the presence of the object by determining whether the objects are put on the top of the charger block 14.

When particular problems do not occur by the use of the non-mental materials and the load modulation caused by the movement of the objects, the wireless multi-power transmission device 10 may be converted into the standby mode step (S01). However, the heat generation and erroneous operations of equipment may occur due to the charging operation in the case of the electronic equipment that may not be charged in a wireless manner, not in the case of the wireless power transmission device 30 that may be charged in a wireless manner.

Therefore, the object detection step (S02) includes: detecting these foreign substances (parasitic metal detection (PMD)) (S021). That is to say, the foreign substance detection step (S021) includes: determining whether a detection signal is not a normal signal, the detection signal being detected through the corresponding primary charging core 13 and the reception signal processor module 24 according to the load modulation generated by objects in a plurality of the charger blocks 14. The signal transmitted under the control of the central controller 21 is determined whether it is an abnormal signal whose signal determination is impossible by comparing the reception signal according to the load modulation. Therefore, the corresponding charger block 14 is converted into a foreign substance detection mode when the corresponding charger block 14 detects a foreign substance, and displays a foreign substance error in the LCD panel 153 or the charging LED 154 when the detected foreign substances is a metal or electronic equipment, and operates to stop a charging operation of the corresponding charger block 14 (parasitic metal detection (PMD) error).

3) However, a native ID determination step (S03) of analyzing and determining the detected signal according to the load modulation when the detected reception signal is determined to be data for native ID of the wireless power transmission device 30 that may be charged in a wireless manner. In the standby mode step (S01), a signal for searching the wireless power transmission device 30 is transmitted together with a request signal for requesting a data value of the native ID of the wireless power transmission device 30. Therefore, an induced electric current generated by the secondary charging core 32 is rectified through the rectifier block 33 in the wireless power transmission device 30, and then filtered through the smoothing Filter block 34. During this process, information on the received native ID request is transmitted to the device controller 390 of the power receiver controller 39, and therefore a native ID data value of the corresponding wireless power transmission device 30, which is stored in the device memory unit 391, is transmitted to the wireless multi-power transmission device 10 via the signal processor block 392. Therefore, in the case of the native ID determination step (S03), the receive reception signal according to the load modulation is processed in the reception signal processor module 24 coupled to the primary charging core 13 of the wireless multi-power transmission device 10, and then transmitted to the main controller 210 of the central controller 21 via the received signal processor block 214. Then, the main controller 210 determines whether the received data is a normal native ID data of the wireless power transmission device 30, and then determines whether the wireless power transmission device 30 is a normal device that can be charged in a wireless manner by determining whether the received data is a native ID data transmitted from the normal wireless power transmission device 30.

4) Subsequently, when the received data is proven to be a native ID transmitted from the wireless power transmission device 30, a fully charged power transmission step (S04) of transmitting a fully charged transmission power from the primary charging core 13 of the corresponding charger block 14 is performed in the multi-gate driver module 23.

Referring to the fully charged power transmission step (S04) in the wireless multi-power transmission device 10, when the main controller 210 of the central controller 21 determines that the normal wireless power transmission device 30 is put on the charger block 14 of the main controller 210, the main controller 210 transmits a control signal with the transmission of the power signal via the gate output signal processor block 213 and the gate signal path 234.

Since the control signal is transmitted to the multi-gate driver module 23, and then transmitted with the transmission of the power signal, a power signal is transmitted to the primary charging core 13 of the corresponding charger block 14 via the corresponding full-bridge resonant converter 22, and then the power signal is transmitted to the wireless power transmission device 30 due to the generation of an induced magnetic field.

During a series of these processes, configurations of the gate signal path 234 and the multi-gate driver module 23 will be described in more detail, as follows.

First, the gate signal path 234 may be composed of a plurality of signal paths corresponding respectively to the respective charger blocks 14. Therefore, a control signal of the main controller 210 is transmitted to the multi-gate driver module 23 via the respective corresponding signal paths of the gate signal paths 234. In this case, the multi-gate driver module 23 may include a gate signal converter unit 232 for processing a gate signal; an output driver 233 for transmitting the processed signal to the corresponding full-bridge resonant converter 22; and a gate controller 231.

Therefore, the gate signal path 234 is composed of a plurality of signal paths corresponding to the respective charger blocks 14. In this case, the main controller 210 is configured to transmit respective control signals to the charger block 14 respectively via the gate output signal processor block 213 including a plurality of output signal processor members, and therefore the gate signal converter unit 232 of the multi-gate driver module 23 may be composed of a plurality of converter members corresponding respectively to the charger blocks 14.

And, the gate controller 231 is configured to control the signal transmission/reception and signal processing in the multi-gate driver module 23. According to this exemplary embodiment, the control signal transmitted from the main controller 210 may be transmitted to members corresponding respectively to the charger blocks 14, and therefore a power signal is transmitted to stably transmit an induced magnetic field. As a result, this configuration is suitable to a small wireless multi-power transmission device 10.

Also, according to another exemplary embodiment of the multi-gate driver module 23 and the gate signal paths 234, the gate signal path 234 may be configured as a single path, and the gate signal converter unit 232 of the multi-gate driver module 23 may also be configured as a single converter member (or a plurality of converter member).

In this regard, the main controller 210 transmits a control signal to the multi-gate driver module 23. In this case, the control signal is transmitted together with a code signal for the corresponding charger block 14 prior to transmission of a conversion signal, and the gate controller 231 of the multi-gate driver module 23 receiving the control signal determines a signal for which charger block 14 the control signal transmitted from the main controller 210 is, and the converted power signal may be transmitted to the full-bridge resonant converter 22 as a code signal for the corresponding charger block 14.

Therefore, it is possible to simplify the configuration of the main controller 210 and the multi-gate driver module 23, and this configuration may be suitable to manufacture the wireless multi-power transmission device 10 and the wireless power transmission device 30 in a large scale.

5) Then, a charging control step (S05) is performed by requesting information on a charging state to the wireless power transmission device 30 and controlling a charging level according to the received charging information of the wireless power transmission device 30.

Then, the wireless power transmission device 30 controls the charger IC block 36 and the protection circuit module block 37 to charge a power source into the battery cell 35, the power source being transmitted via the rectifier block 33 and the smoothing filter block 34 under the control of the device controller 390 after the fully charged power transmission step (S04).

For this charging operation, the device controller 390 receives information on a charging state of the battery cell 35 through the charger IC block 36 and the protection circuit module block 37, and temporally stores the information on a charging state in the device memory unit 391. Then, when the battery cell 35 is in a fully charged state, the charging operation is stopped by controlling the charger IC block 36. Also, information on the fully charged state is generated in the secondary charging core 32 through the signal processor block 392. Also, when a voltage of the charged battery cell 35 is less than a predetermined reference voltage, the battery cell 35 is converted again into a charging state to perform another charging operation. However, the battery cell 35 is proven to be in a fully charged state, the charging of the battery cell 35 is stopped (No Operation).

Therefore, the main controller 210 of the wireless multi-power transmission device 10 requests information on the charging levels in every step of the wireless power transmission device 30 in the charging control step (S05). In this case, the device controller 390 of the wireless power transmission device 30 transmits data of the information on the charging state of the battery cell 35 using a load modulation method.

As described above, the information on the charging state transmitted from the wireless power transmission device 30 is transmitted to the main controller 210 coupled to the received signal processor block 214 through the reception signal processor module 24. The reception signal processor module 24 includes a plurality of reception signal input units 243 for receiving signals detected in the respective charger blocks 14 through the load modulation; a reception signal processor unit 242 for converting a detection signal according to the load modulation of each of the charger blocks 14; and a reception signal controller 241 for controlling an operation of the reception signal processor module 24.

Therefore, the transmission information of the wireless power transmission device 30 received through the load modulation is converted into signals in the reception signal processor module 24, depending on the respective charger blocks 14, and the converted signals are transmitted to the main controller 210 through the received signal processor blocks 214.

The reception signal processor module 24 may generally have a plurality of amplifiers, LPF, OR logic circuits and the like, all of which are mounted thereinside. In particular, in the case of the configuration of the reception signal processor unit 242 and the reception signal path 244 of the reception signal processor module 24, the reception signal processor unit 242 and the reception signal path 244 may be configured as a single member or as a plurality of members so as to generate a native code each of the corresponding charger blocks 14, as described above in the exemplary embodiment of the multi-gate driver module 23.

That is to say, when signals according to the load modulation are transmitted to each of the charger block 14s, a plurality of the reception signal processor units 242 according to this exemplary embodiment process their own signals, and transmit the processes signals to the main controller 210 via the respective reception signal paths 244. Therefore, signals generated in the corresponding charger blocks 14 are accurately transmitted to the main controller 210 through the separate signal processing and via the paths, and processed in the main controller 210, and therefore it is possible to operate a system stably. Also, this system may suitably apply to small devices as in the above-mentioned multi-gate driver module 23.

In addition, for the exemplary embodiment in which each of the reception signal processor unit 242 and the reception signal paths 244 is configured as a single member, the reception signal processor unit 242 of the multi-gate driver module 23 determines a reception signal for which charger block 14 the received signal according to the load modulation is under the control of the reception signal controller 241, and the processed reception signal is divided into categories together with the code signal for the corresponding charger blocks 14 when the processed reception signal is transmitted via the received signal processor block 214. Then, the main controller 210 receives the reception signals for the respective charger blocks 14, divides respective signals into categories and processes the signals by category. Therefore, the configuration of single members may be used as the simplified configuration of the entire members.

Accordingly, the wireless multi-power transmission device 10 requests data information on a charging level to the wireless power transmission device 30 that is charged in the corresponding charger block 14 through the multi-gate driver module 23 and the primary charging core 13, depending on the corresponding charger block 14. As a result, the corresponding wireless power transmission device 30 transmits the data information on a charging level of the battery cell 35 that is received via the charger IC block 36 and the protection circuit module block 37.

Also, the information is transmitted to the main controller 210 via the primary charging core 13 of the respective charger block 14 and the reception signal processor module 24.

Then, the main controller 210 of the central controller 21 displays information on a charging level or state in the form of letters or figures on the LCD panel 153 through the signal output block 212, depending on the data of the charging level in the corresponding wireless power transmission device 30, and controls the charging LED 154 to display that the corresponding charger block 14 is on charge. Then, the LCD panel 153 displays a charging state along with the number of the corresponding charger block 14. Also, the LCD panel 153 displays that each of the respective charger blocks 14 turns on the charging LED 154. For example, the charging operation of the battery cell 35 is stopped when a lamp of the charging LED 154 is turned off, the battery cell 35 is on charge when the lamp is flickered, a green light is turned on the battery cell 35 is fully charged, and a red light is turned on when errors such as a foreign substance error, a native ID error are caused. As described above, the charging operation of the battery cell 35 may be performed in various manners.

During a series of these charging processes, when the wireless power transmission device 30 moves from the corresponding charger block 14 of the wireless charger table 12, a charging efficiency in the wireless power transmission device 30 may be maximized by converting a power signal transmitted from the corresponding charger block 14 of the wireless multi-power transmission device 10.

6) Finally, when the information on the fully charged state is received from the wireless power transmission device 30, the fully charged state is displayed in the LCD panel 153 or the charging LED 154 corresponding to the respective charger block 14, and the fully charged state step (S06) of stopping the charging operation is performed to stop the charging operation for the corresponding charger block 14.

When a user removes the fully charged wireless power transmission device 30 from the charger block 14 whose charging operation is stopped, and inputs an operation start signal again, the charger blocks 14 is preferably in a standby mode.

Also, when a foreign substance error or an ID error is caused in the foreign substance detection step of detecting foreign substances, the error is displayed in the corresponding charger block 14, and the charging operation of the corresponding charger block 14 is then stopped to ensure the stability of the wireless multi-power transmission device 10, the wireless power transmission device 30 or other metal materials, and the electronic equipment. Therefore, when the charging operation of the corresponding charger block 14 is stopped due to the generation of the errors, the charger block 14 is in a standby mode until a re-start signal is inputted into the charger block 14 by a user.

Of course, a pulse signal is periodically transmitted to the charger blocks 14 when there is the error or the fully charged state. In this case, the charger blocks 14 are normally converted into a standby mode when the charger blocks 14 senses that the error is solved, for example, by removing the fully charged wireless power transmission device 30 or foreign substances using the signal according to the load modulation.

Also, the main controller 210 of the wireless multi-power transmission device 10 may be configured to control the charger block that is on charge to transmit a native code signals for the respective charger blocks 14 together with the charge power signal. Therefore, the device controller 390 may be configured to analyze the native code signals for the corresponding charger blocks 14 that are transmitted from the wireless multi-power transmission device 10, and the device memory unit 391 may be configured to store a data value of the native code signals for the corresponding charger blocks 14 that are transmitted from the device controller 390.

In addition, the device controller 390 is configured to control the data value for the voltage value of the power signal to be transmitted to the wireless multi-power transmission device 10, the voltage value of the power signal being received for the request signal received from the wireless multi-power transmission device 10.

Also, a power source for USB ports of computers, and a power source inputted from an AC adapter, a cigar Jack and the like may be supplied to the power supply unit 25.

Also, a temperature detector unit 26 is provided to detect temperature of the corresponding charger block 14 or the wireless multi-power transmission device 10 during the charging procedure. Therefore, an operation of the corresponding charger block 14 may be stopped when the corresponding charger block 14 is heated to the hot temperature detected in the temperature detector unit 26, and an operation of the entire system may be stopped when the entire wireless multi-power transmission device 10 is heated to the hot temperature.

In addition, a current detection member may be provided in each of the power supply unit 25, the multi-gate driver module 23, the respective full-bridge resonant converters 22 or the reception signal processor modules 24 to monitor a flow of electric current. In this case, when the corresponding members becomes an over current and overvoltage state by means of the current detection member, operations of the corresponding member and its related charger block 14 are stopped, or an operation of the system is stopped, and they transmit a signal for the error.

Then, FIG. 13 is a configuration view showing a wireless multi-power transmission device according to one exemplary embodiment of the present invention. Referring to the configuration of the wireless multi-power transmission device according to one exemplary embodiment of the present invention, the wireless power transmitter includes a control logic for IC communication with a receptor module installed inside the wireless power transmission device that is a wireless device; and a pre-driver for driving a full-bridge resonance-type converter to generate an induced electromotive force using LC resonance. And, an SPI controller for communication with EEPROM for storing various parameters may be installed inside the wireless power transmitter. Also, a clock input port for operation of the system, an LCD backlight for displaying a charging state of the wireless device, and an input/output port for controlling ports of the LCD may be installed inside the wireless power transmitter. Furthermore, the wireless power transmitter may include an LED input/output port for checking the operation of the wireless device, VCC and GND input ports for DC power source, and a shout-down port for detecting temperature of a transmission coil and stopping the operation of the wireless device when an inside comparator determines the temperature of the transmission coil to be more than a predetermined temperature.

Also, FIG. 14 is a configuration view showing a central controller of the wireless multi-power transmission device according to one exemplary embodiment of the present invention. Here, it is shown that the central controller may be configured with a single mold. This single chip may have a function to enable wireless power transmission, and the FET Pre-driver has an output function, and the analog unit has a comparator installed thereinside, the comparator having an ID detection function, and may include a power-on reset, 5V, VCC-5V, a 3.3V positive-voltage regulator (including a shut-down function in shortcut), and an input port for detecting temperature of the transmission/reception coil temperature. Also, the digital unit may include an SPI interface for serial communication, a logic for controlling wireless power transmission, and an amplifier for an external system clock oscillator amplifier. Also, a plurality of input/output ports may be installed inside the central controller to drive LED, backlight, LCD, etc.

Also, FIG. 18 is a circuit view showing a wireless device control module of the wireless power transmission device according to one exemplary embodiment of the present invention. Here, it is shown that members for controlling the wireless power transmission device 30 may be configured with a single mold. That is to say, the wireless device control module has a function to communicate with the wireless multi-power transmission device 10 in a wireless manner, and may include members such as a pre-driver and FET for ID generation, a comparator for analog input, a power-on reset as an analog unit, a clock oscillating circuit, 64-bit interior/exterior ID and a control logic. When a voltage of a battery is detected by this mold, the wireless device control module may have a function to be converted into a recharge mode, a function to feed back a value of the fully charged state of the charger IC, a function to detect a phase to recognize an encryption code, etc. In addition to the functions, the wireless device control module may be designed to have an output port for controlling an external DC/DC converter or a charger IC, an analog input and a comparator for controlling up and down of power, input/output ports for setting various modes.

Also, FIG. 19 is a circuit view showing a wireless power transmission device according to one exemplary embodiment of the present invention. Here, it is shown that a member for processing a power signal transmitted from the wireless multi-power transmission device 10 may be formed with a singly mold.

Referring to the configuration of this mold, a synchronous rectifier chip aids the adjustment of power in a receptor module of the power-receiving battery system using an induced electromotive force. Therefore, the mold may include a synchronous rectifier for generating a DC voltage from a reception coil to minimize the power loss and the heat generation, and a buck-converter used to previously control the output of the rectifier so as to supply a predetermined voltage to a charging circuit. This buck-converter may be switched on at a rate of high-speed 2 MHz so as to reduce output ripples of the rectifier and employ a micro chip inductor. Also, the output of the buck-converter may be used as an input of a linear charging circuit, and a built-in linearly charging function allows a battery to be charged with CC/CV. In this case, the battery is designed to set a charge electric current to a predetermined current level. This linearly charging function has a fully charged state port that may feed back a charging state of the battery, and the linearly charging function may also have a low dropout (LDO) regulator installed thereinside, the LDO regulator having an output voltage of 2.85V to supply a power source to a power receiver chip (a wireless device control module) that is IC for controlling external systems.

Also, this synchronous rectifier chip has low heat generation and drop characteristics (i.e., 0.4V drop in a rectifier), and has a 2 MHz buck-converter installed thereinside for the purpose of the high efficiency. Also, the synchronous rectifier chip may be maintained to the maximum input voltage of about 20V, installed inside the battery pack in the form of a Micor SMD package, and optimized for the wireless power transmission within several hundreds of kHz bandwidth. In this case, a P-channel field effect transistor (PFET) of the buck-converter has a low Rdson value of 240 mΩ and the maximum load current of 700 mA, and a LDO regulator with 2.85V@10 mA may be installed inside the PFET.

Next, a power control procedure will be described in more detail in the charging control step (S05), as follows.

That is to say, a power signal transmitted by the primary charging core 13 of the wireless multi-power transmission device 10 is transmitted via the secondary charging core 32 of the wireless power transmission device 30. In this case, the device controller 390 receives information on the input voltage intensity of the power signal. Then, the device controller 390 desirably maintains the voltage of the power signal to a constant voltage level when the device controller 390 detects that a voltage (for example, about 5V) of the power signal received in the device controller 390 is transmitted as a stable voltage. When the voltage of the power signal received in the device controller 390 is too low or too high, the wireless power transmission device 30 may be configured to receive a constant voltage by transmitting information on voltage regulation to the wireless multi-power transmission device 10 in a load modulation manner. When the voltage of the power signal is regulated to the constant voltage, the device controller 390 controls the battery cell 35 to be charged with power by converting an operation of the charger IC in the charger IC block 36 of the wireless power transmission device 30 into an active state.

When the battery cell 35 of the wireless power transmission device 30 is charged with the power transmitted from the wireless multi-power transmission device 10 as described above, the protection circuit module block 37 is configured to stably charge the battery cell 35 with electric power by checking the stability of the battery cell 35 while the battery cell 35 is on charge.

Figure 7:
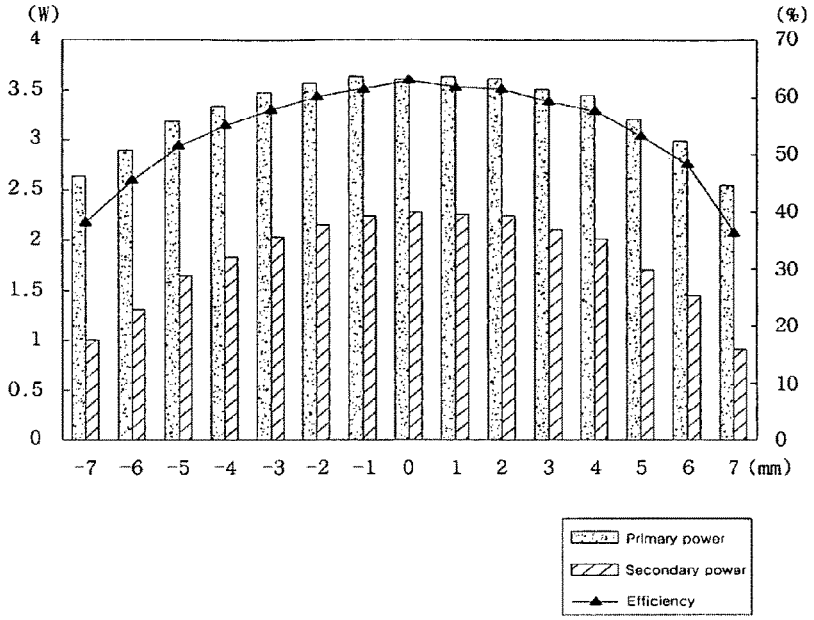
FIGS. 7 to 12 are graphic diagrams illustrating the efficiencies to the power control in the wireless multi-charger system according to the present invention.
Figure 8:
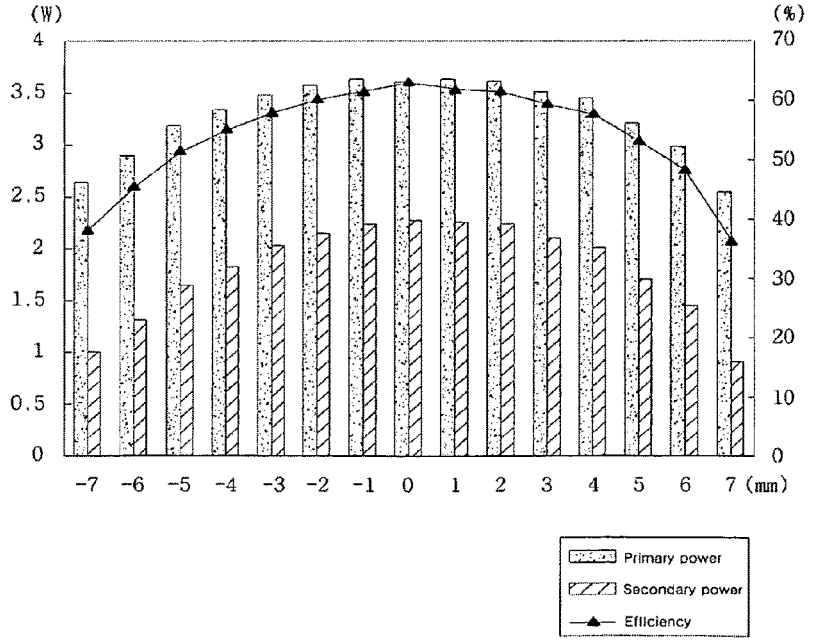

When the wireless power transmission device 30 put on the corresponding charger block 14 of the wireless multi-power transmission device 10 moves around during the charging operation of the wireless multi-charger system (A) used as the wireless multi-power transmission device 10 and the wireless power transmission device 30, positions of the primary charging core 13 and the secondary charging core 32 are changed, which leads to the decreased receiving rate of the power signal received from the wireless power transmission device 30. As a result, the primary charging core 13 and the secondary charging core 32 move to inappropriate positions as the wireless power transmission device 30 becomes remote from the center toward a horizontal or vertical direction as shown in FIGS. 7 and 8, and therefore an induced electromotive force is not desirably generated in the wireless power transmission device 30.

Therefore, when the voltage of the power signal, which is received into the wireless power transmission device 30 put on the corresponding charger block 14, is less than the reference voltage value, the wireless multi-charger system (A) according to the present invention transmits a request signal for voltage compensation to the wireless multi-power transmission device 10 so as to supplement the shortage in the voltage of the power signal and transmit the supplemented voltage of the power signal.

For example, assume that a voltage of the received power signal is set to the reference voltage of 5V, and a reference deviation value is set to a voltage of 0.5V. In this case, when the wireless power transmission device 30 receives a voltage of less than 4.5V due to the movement of the wireless power transmission device 30, the device controller 390 of the wireless power transmission device controller module 39 controls the secondary charging core 32 to boost a voltage by about 0.5V and transmit the boosted voltage. Then, the secondary charging core 32 transmits a boost request signal via the signal processor block 392.

As a result, the wireless multi-power transmission device 10 transmits the boosted power signal in response to the 0.5V boost request signal. That is to say, an oscillation frequency may be varied, for example, to boost a transmission power outputted from the wireless multi-power transmission device 10.

As described above, the power signal transmitted from the wireless multi-power transmission device 10 is regulated according to the changes in the position of the wireless power transmission device 30. Theses charging efficiencies according to the changes in the position are shown in FIGS. 7 to 12.

That is to say, FIGS. 7 to 10 are graphic diagrams showing a primary power (W) in the wireless multi-power transmission device and a secondary power (W) in the wireless power transmission device, and their efficiencies (%), all of which are measured by moving the wireless power transmission device 30 on the corresponding charger block 14 of the wireless multi-power transmission device by −7 mm~7 mm in a horizontal direction and a vertical direction, respectively, when it is assumed that a secondary reference power of the wireless power transmission device is set to a voltage level of about 2.5 W. Here, the efficiency (%) is represented by an efficiency of an output power of the wireless multi-power transmission device to a primary input power of the wireless multi-power transmission device ((secondary power/primary power)*100), the output power being applied to a secondary side of the wireless multi-power transmission device.

Also, it is shown that the compensation of the transmission power is adjusted to a voltage level 0.5 W according to the present invention. Therefore, FIGS. 7 and 8 show graphs that is plotted in a secondary power of 2~2.5 W in the case of the wireless power transmission device, which indicates the charging efficiency when the wireless power transmission device 30 is charged without the compensation of the power signal according to the changes in frequency in the wireless charger apparatus 10 relative to the changes in horizontal distances and vertical distances of the wireless multi-power transmission device 10 and the wireless power transmission device 30. That is to say, when wireless power transmission device 30 moves in a horizontal distance or a vertical distance relative to the wireless multi-power transmission device 10, a secondary power of the wireless power transmission device 30 drops as the secondary power goes away from the center of the wireless power transmission device 30, which leads to the decreasing efficiency.

Figure 9:
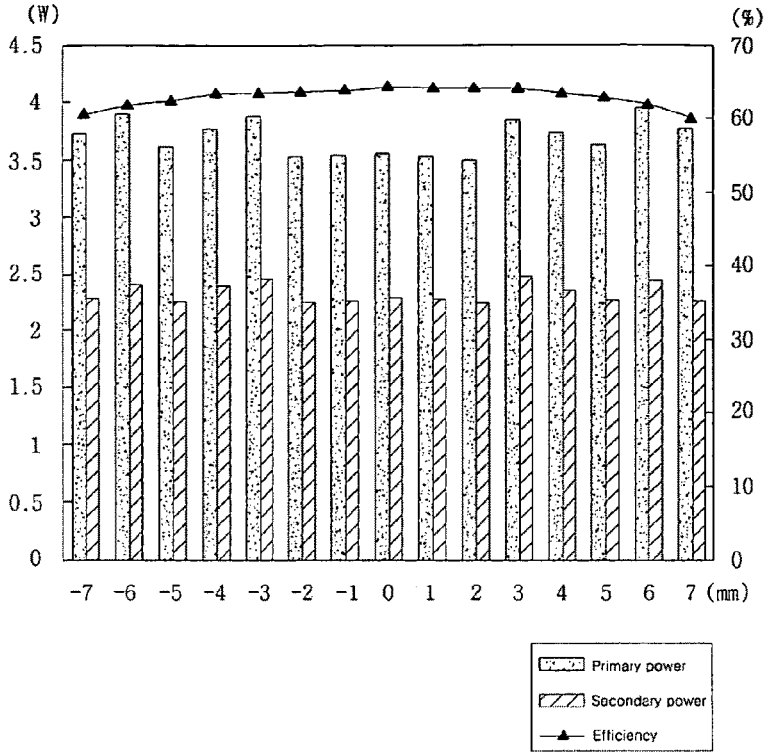
Figure 10:
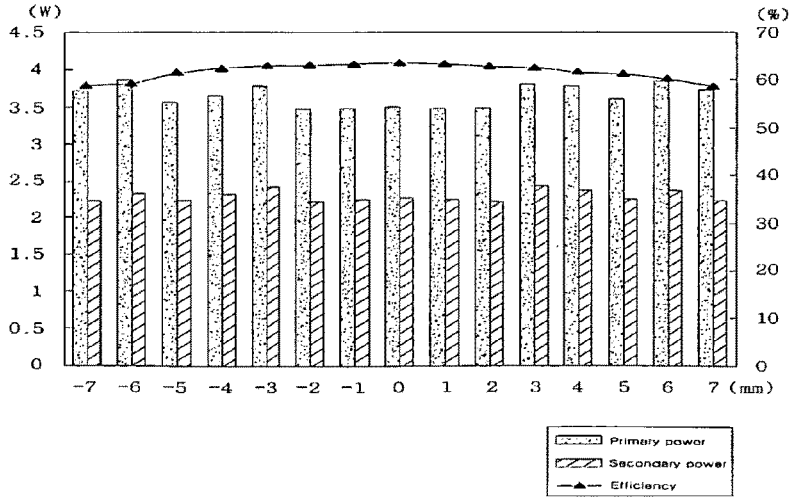

However, for the wireless multi-charger system (A) according to the present invention as shown in FIG. 9 (a graph according to the movement of the wireless power transmission device 30 in a horizontal direction) and FIG. 10 (a graph according to the movement of the wireless power transmission device 30 in a vertical direction) on the contrary to FIGS. 7 and 8, information on the changes in the received power voltage is transmitted from the wireless power transmission device as the wireless power transmission device 30 moves in a horizontal direction and a vertical direction on the top of the charger block 14 of the wireless multi-power transmission device 10. As a result, the wireless multi-power transmission device 10 shows its efficiency by controlling a power through the changes in frequency. This indicates that the power transmission is stably performed in the wireless power transmission device 30, and therefore it is revealed that the efficiency in the power transmission is good.

Figure 11:
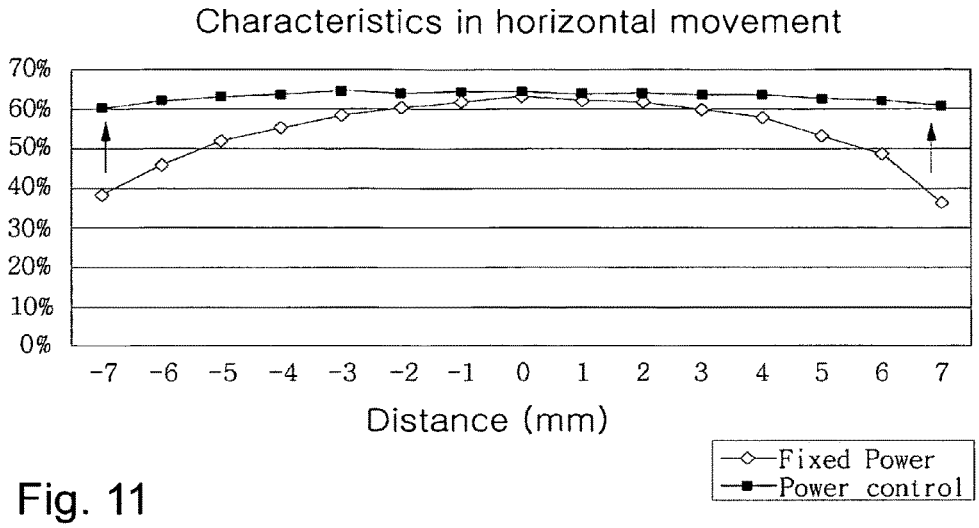
Figure 12:
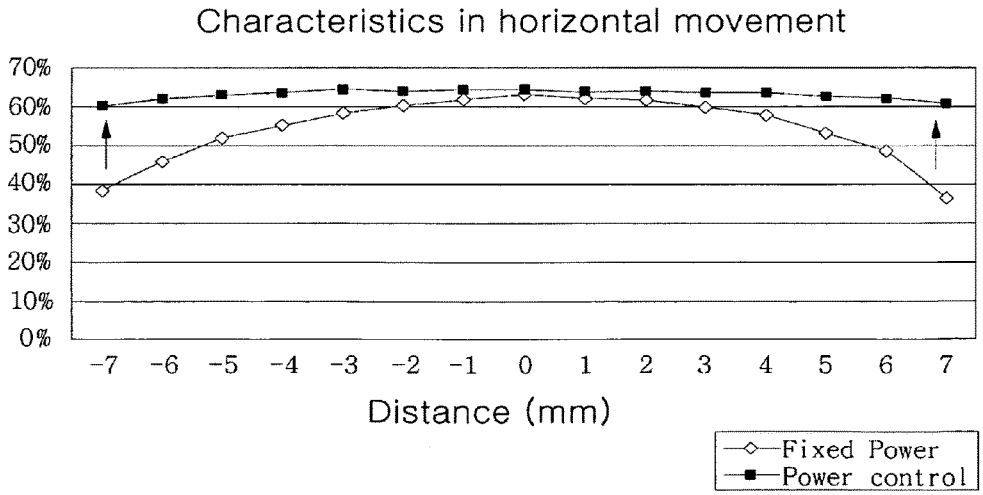

Also, FIG. 11 shows a graph plotting efficiencies according to the movement of the wireless power transmission device 30 in a horizontal direction, and FIG. 12 shows a graph plotting efficiencies according to the movement of the wireless power transmission device 30 in a vertical direction. Here, it is revealed that the efficiencies are better when there is the power compensation according to the change in frequency (an upper rectangular dot graph, POWER CONTROL) than when there is no power compensation according to the change in frequency (a lower curve graph, FIXED POWER).

Therefore, a power source is stably transmitted in a wireless manner through the wireless power transmission of the wireless multi-charger system (A) that is carried out in the wireless multi-power transmission device 10 and the wireless power transmission device 30. Therefore, the wireless multi-power transmission device 10 and the wireless power transmission device 30 may be stably used in the wireless multi-charger system (A).

In particular, the charging method for the power compensation in the charging control step (S05) of performing the above-mentioned wireless power transmission may be used as a better charging method in the case of the configuration in which a plurality of the charger blocks 14 are provided in the wireless multi-power transmission device 10 according to the present invention.

That is to say, various kinds of the wireless power transmission devices 30 may be positioned and charged on the wireless charger table 12 in the case of the configuration in which a plurality of the charger blocks 14 is configured on the wireless charger table 12 as shown in FIG. 1.

In this case, portable wireless power transmission devices such as mobile phones, PDA, PMP, DMB terminals, MP3 or notebook computers may be used as the wireless power transmission device 30. While one wireless power transmission device is charged on the charger block 14 positioned in one side of the wireless charger table 12, another wireless power transmission device may be put and charged on the charger block 14 positioned in another side of the wireless charger table 12.

Furthermore, when a user touches the wireless power transmission device that is being already charged, or shakes the wireless multi-power transmission device 10, a primary charging core of the corresponding charger block 14 and a secondary charging core of the wireless power transmission device that is on charge may be unfortunately changed in position. Since the wireless power transmission device that is being on charge is charged with a stable voltage due to the compensation of the charging power as described above, a corresponding device may continue to be charged without any big troubles until the device is in a fully charged state.

For the wireless multi-charger system (A) according to the present invention, a wireless power transmission device is charged on each of the respective charger blocks 14. In this case, small mobile phones may not only be charged on the respective charger blocks 14, but large wireless power transmission devices that may be charged in a wireless manner may also be charged on the respective charger blocks 14.

Therefore, a secondary charging core of the corresponding wireless power transmission device may be charged in a position corresponding to a primary charging core of one charger block, but other parts of the wireless power transmission device that are free from the secondary charging core are put on other charger blocks due to the big size of the wireless power transmission device. In this case, the other charger blocks are converted into a foreign substance error mode to stop the power transmission, which may prevent the damage of other part of the wireless power transmission device.

Also, since parts, such as metal lines, of the wireless power transmission device may be used to perform a wireless charging operation, the charger blocks on which the parts are positioned are converted into a foreign substance error to stop the power transmission. Therefore, the wireless power transmission device and the wireless multi-power transmission device may stably perform their charging operation according to the power transmission since only the charger block on which the secondary charging core of the large wireless power transmission device is positioned performs its wireless charging operation.

In addition, the wireless power transmission device 30 according to the present invention includes a shielding member for protecting the wireless power transmission device 30 and the battery cell 35 from the magnetic field that is generated by the primary charging core 13 of the wireless multi-power transmission device 10 and the secondary charging core 32 of the wireless power transmission device 30, as shown in FIGS. 15 to 19.

First of all, FIG. 13 is an exploded perspective view showing a configuration of a wireless power transmission device 30 having a wireless power receiver module. Here, a battery pack composed of coil, fine metal, thin aluminum film (foil, etc.), lithium ion or lithium polymer has no effect on cells since a thin aluminum film is introduced into the battery pack to completely cut off the magnetic field, which allow the cells to be charged/discharged at cell cycles of 500 or more. Here, the shapes of the secondary charging core include all kinds of cores. That is to say, the shapes of the core may include a rectangular shape, a round shape or an oval shape, and various cores such as a winding coil, a spiral core and the like may be provided herein. In this case, the wireless power transmission device 30 having a wireless power receiver module includes a wireless power receiver circuit 40 including members such as a power receiver controller 39 and a charger IC block 36, both of which are formed in one side of the charging battery cell 35, and the wireless power receiver circuit 40 may include a shielding member 41 for preventing a surrounding magnetic field.

Also, the wireless power transmission device 30 is provided with shielding plates 42, 43, 44, 45 and 46 provided in the bottom, the front, the rear, the left side and the right side of the charging battery cell 35 to protect the battery cell 35 from the magnetic field of the primary core block and the secondary core block 32 by shielding the magnetic field.

Then, since the five regions, for example, the front, the rear, the left side, the right side and the bottom of the battery cell 35 are provided respectively with the shielding plates 42, 43, 44, 45 and 46 to cut off the magnetic field generated by the primary core block and the secondary core block 32, it is possible to prevent damage of the battery cell 35 from the magnetic field. Therefore, an additional shielding plate may be provided in an upper surface of the battery cell 35, when necessary. In this case, it is desirable when temperature is not increased due to the completely closed surroundings of the battery cell 35.

As described above, the shielding plates 42, 43, 44, 45 and 46 and the shielding member 41 may be formed of thin discs including Al, Cu, Ni Alloy metals.

Also, a magnetic plate 48 is formed between the shielding plates 46 and the charge receiver module 321 to facilitate the induction of the magnetic field induced from the secondary charging core 32, the shielding plates 46 formed in the bottom of the battery cell 35, and the charge receiver module 321 including the secondary charging core 32. This magnetic plate 48 includes amorphous ferrites, Mn—Zn (50 parts by weight:50 parts by weight), Ni—Fe (80 parts by weight:20 parts by weight), fine metals (Fe—Si—Cu—Nb), etc.

The magnetic plate 48 may be composed of an upper magnetic plate 481 formed between the shielding plates 46 and the charge receiver module 321; and a lower magnetic plate 252 disposed in a lower portion of the charge receiver module 321. Therefore, the lower magnetic plate 482 may have a lower plate thorough hole as a thorough hole passed through the center thereof. This shape of the lower plate thorough hole 483 is preferably formed with the same shape as the core of the secondary core block 32. For example, FIG. 15 shows that the lower plate thorough hole 483 of the lower magnetic plate 482 is formed with a round shape since the secondary core block 32 is formed of a round core. However, when the core is formed with a rectangular shape or a polygonal shape, the lower plate thorough hole 483 is preferably formed with the same shape. Therefore, an induced electromotive force is easily generated in the secondary core block 32 due to the presence of the lower plate thorough hole 483, the secondary core block 32 being that is present within the induced magnetic field, and the signal may be transmitted/received in an easy manner.

Also, the magnetic plate 48 is provided with an insulating plate 47 that is provided between the shielding plates 46 and the battery cell 35 to insulate the battery cell 35, the shielding plates 46 being formed in the bottom of the battery cell 35. Since this insulating plate 47 is formed in the form of a mesh or thin film that is made of Ni—Cu, the heat of the shielding plates 46 is not delivered to the battery cell 35.

As another example of the magnetic field shielding member, the magnetic plate 48 is provided with a magnetic plate 48 (a primary HPES:Hanrim Postech Electro-magnetic shield) formed between an aluminum-based battery cell case 35' and the secondary core block 32 as shown in FIG. 16, the aluminum-based battery cell case 35' constituting an outer body of the battery cell 35. In this case, a shield mesh member 49 is further provided as a secondary HPES between the magnetic plate 48 (i.e., a primary HPES) and the battery cell case 35'. The magnetic plate 48 as a primary HPES and the shield mesh member 49 as a secondary HPES may be composed of the same components as in the above-mentioned shielding member.

It is known that most of the magnetic field is shielded by the magnetic plate 48 that is a primary HPES. As shown in FIG. 16, it is revealed that a line of magnetic force does not affect a battery cell since the line of magnetic force is bent by the magnetic plate 48 that is a shielding plate. As a result, the heat is generated in a peak region by the line of magnetic force, and then radiated out by the metallic magnetic plate 48. In addition, the shield mesh member 49 as a secondary HPES is formed by coating a metal mesh with a coating agent selected from the group consisting of amorphous ferrites, Mn—Zn (50 parts by weight:50 parts by weight), Ni—Fe (80 parts by weight:20 parts by weight), or fine metals (Fe—Si—Cu—Nb). Therefore, the secondary HPES functions to shield the magnetic field that is not shielded by the magnetic plate 48 that is a primary HPES. An eddy current is formed by excessive line of magnetic force in the metal mesh of the shield mesh member 49 that is a secondary HPES. In this case, the battery pack should be affected by the magnetic field that is generated by the primary core block and the secondary core block due to the presence of the eddy current formed in the metal mesh. In this experiment, it is revealed that about 90% of the magnetic field is shielded by the magnetic plate 48 that is a primary HPES, and about 10% of the magnetic field is shielded by the shield mesh member 49 that is a secondary HPES.

The wireless power transmission device 30 including the magnetic plate 48 as a primary HPES and the shield mesh member 49 as a secondary HPES is used to repeat a charging experiment (500 cycles) for the charging efficiency. Here, a battery is not coupled to a charging device in wireless manner, but the battery is coupled to the charging device through wires to perform a charging/discharging experiment, as shown in FIG. 17. Accordingly, FIG. 17 shows a graph that is plotted using an 80% efficiency curve as the reference curve (hereinafter, referred to as "standard efficiency line segment" (D)), the 80% efficiency curve being obtained through the repeated charging/discharging of a battery pack at 500 cycles and referred to as a stable charging efficiency. First, when the wireless power transmission device 30 is generally charged through electrical contacts without the exposure to the magnetic field (a graph represented by "N" in FIG. 17), the experiment of the wireless power transmission device 30 is carried out so that the charging capacities can be plotted over the standard efficiency line segment, which indicates that the charging/discharging efficiency is stable in the battery pack.

Accordingly, for the wireless power transmission device 30 according to the present invention, it is shown that the charging/discharging efficiency by the magnetic plate 48 as a primary HPES and the shield mesh member 49 as a secondary HPES (a graph represented by "A" in FIG. 17) is stable with an efficiency of 83.9% on the basis of 500-cycle charging/discharging experiment.

However, when the secondary HPES is not used in the wireless power transmission device 30, it is shown that the charging/discharging efficiency (a graph represented by "B" in FIG. 17) is rather low with an efficiency of 75.3% on the basis of 460-cycle charging/discharging experiment. When the primary HPES and the secondary HPES are not used in the wireless power transmission device 30, it is shown that the charging/discharging efficiency (a graph represented by "C" in FIG. 17) is very low with an efficiency of 74.5% in the charging/discharging experiment at 340 cycles that are far away below the 500 cycles. However, it is revealed that the wireless power transmission device 30 according to the present invention shows a highly excellent charging/discharging efficiency.

The description proposed herein is just an exemplary embodiment for the purpose of illustrations only, not intended to limit the scope of the invention, so it should be understood that other equivalents and modifications could be made thereto without departing from the spirit and scope of the invention as apparent to those skilled in the art. Therefore, it should be understood that the present invention might be not defined within the scope of which is described in detailed description but within the scope of which is defined in the claims and their equivalents.

The invention claimed is:

[1. A wireless multi-charger system comprising a wireless multi-power transmission device for transmitting a power signal to a wireless power transmission device in a wireless manner, wherein the wireless multi-power transmission device include a wireless charger case formed as an external body, the wireless charger case having a full-bridge resonant converter and a central controller mounted thereinside to transmit a power signal to the wireless power transmission device in a wireless manner, wherein the wireless charger case has a wireless charger table formed in an upper surface thereof, wherein the wireless charger table has a plurality of charger blocks, each of which includes a primary charging core, wherein the full-bridge resonant converter is present in a plural form and coupled respectively to a plurality of the charger blocks, wherein a multi-gate driver module is provided to transmit a converted power signal to each of a plurality of the full-bridge resonant converters under the control of the central controller, wherein a reception signal processor module coupled to a plurality of the charger blocks to process a signal transmitted from the wireless power transmission device and supply the processed signal to the central controller is provided, and wherein the central controller comprises:

a power supply block coupled to the power supply unit to supply a power source of the wireless multi-power transmission device;

a signal output block for outputting a display signal into an LCD panel and a charging LED;

a gate output signal processor block coupled to the multi-gate driver module to transmit a power signal transmitted from the primary charging core;

a received signal processor block coupled to one side of the primary charging core for processing a signal transmitted from the reception signal processor module for processing a signal transmitted from the wireless power transmission device; and a main controller for controlling the power supply block, the signal output block, the gate output signal processor block and the received signal processor block.]

[2. The wireless multi-charger system according to claim 1, wherein the central controller controls the request for data information on charging capacity to the wireless power transmission device, receives data of the information on charging capacity and data of the power signal voltage transmitted from the wireless power transmission device to determine voltage data of the transmitted power signal, performs an arithmetic operation on the frequency of the power signal to compensate for a transmitted power relative to the voltage data of the power signal of the determined wireless power transmission device, and controls the transmission of the power signal as the compensated frequency to transmit a compensated power signal to the wireless power transmission device.]

[3. A method for controlling a wireless multi-charger system as defined in claim 1, comprising:

transmitting a power signal via the primary charging core from wireless multi-power transmission device of the wireless multi-charger system in every cycle, the power signal including a call signal for calling a native ID value of the wireless power transmission device, and waiting for the receipt of a response signal for the power signal;

determining the presence of an object by checking a detected detection signal according to load modulation in the primary charging core of one of the charger blocks and determining whether the detected detection signal is a normal signal;

determining whether a native ID signal of the wireless power transmission device is received by analyzing the detected reception signal;

transmitting a fully charged transmission power from the primary charging core of the corresponding charger block via the multi-gate driver module when the received native ID signal is determined to be a native ID transmitted from the wireless power transmission device;

requesting information on the charging state to the wireless power transmission device and adjusting a charging level according to the charging information of the wireless power transmission device;

displaying a fully charged state in the LCD panel or the charging LED corresponding to the corresponding charger block and stopping a charging operation when the information on the fully charged state is received from the wireless power transmission device.]

[4. The method for controlling the wireless multi-charger system according to claim 3, wherein the object detection step comprises: converting a plurality of the charger blocks into a foreign substance detection mode when a detection signal detected through the corresponding primary charging core and the reception signal processor module according to the load modulation generated by objects is not a normal signal, displays a foreign substance error in the LCD panel or the charging LED when the detected foreign substance is a metal or electronic equipment, and stops a charging operation on the corresponding charger block.]

[5. The method for controlling the wireless multi-charger system according to claim 3, wherein the charging control step comprises:

requesting data information on the charging capacity to the wireless power transmission device;

receiving data information on the charging capacity and the voltage data of the power signal transmitted from the wireless power transmission device;

determining the voltage data of the power signal transmitted from the wireless power transmission device;

performing an arithmetic operation on a frequency of the power signal to compensate for the transmitted power for the voltage data of the power signal transmitted from the wireless power transmission device;

transmitting a power signal as a compensated frequency to transmit a compensated power signal to the wireless power transmission device.]

[6. A method for controlling the wireless multi-charger system as defined in claim 2, comprising:

transmitting a power signal via the primary charging core from the wireless multi-power transmission device of the wireless multi-charger system in every cycle, the power signal including a call signal for calling a native ID value of the wireless power transmission device, and waiting for the receipt of a response signal for the power signal;

determining the presence of an object by checking a detected detection signal according to load modulation in the primary charging core of one of the charger blocks and determining whether the detected detection signal is a normal signal;

determining whether a native ID signal of the wireless power transmission device is received by analyzing the detected reception signal;

transmitting a fully charged transmission power from the primary charging core of the corresponding charger block via the multi-gate driver module when the received native ID signal is determined to be a native ID transmitted from the wireless power transmission device;

requesting information on the charging state to the wireless power transmission device and adjusting a charging level according to the charging information of the wireless power transmission device;

displaying a fully charged state in an LCD panel or a charging LED corresponding to the corresponding charger block and stopping a charging operation when the information on the fully charged state is received from the wireless power transmission device.]

[7. The wireless multi-charger system according to claim 1, wherein the LCD panel is configured to display a total charging state of the plurality of the charger blocks, and the charging LED is configured to display a charging state of each of the plurality of the charger blocks.]

[8. A wireless multi-charger system comprising a wireless multi-power transmission device for transmitting a power signal to a wireless power transmission device in a wireless manner, wherein the wireless multi-power transmission device include a wireless charger case formed as an external body, the wireless charger case having a full-bridge resonant converter and a central controller mounted thereinside to transmit a power signal to the wireless power transmission device in a wireless manner, wherein the wireless charger case has a wireless charger table formed in an upper surface thereof, wherein the wireless charger table has a plurality of charger blocks, each of which includes a primary charging core, wherein the full-bridge resonant converter is present in a plural form and coupled respectively to a plurality of the charger blocks, wherein a multi-gate driver module is provided to transmit a converted power signal to each of a plurality of the full-bridge resonant converters under the control of the central controller, wherein a reception signal processor module coupled to a plurality of the charger blocks to process a signal transmitted from the wireless power transmission device and supply the processed signal to the central controller is provided, and wherein the wireless power transmission device comprises:

a secondary charging core for transmitting an induced electric current from the magnetic field to correspond to the primary charging core of the wireless multi-power transmission device;

a rectifier block coupled to the secondary charging core to rectify the induced electric current;

a smoothing filter block coupled to the rectifier block to filter an electric current;

a charger IC block coupled to the smoothing filter block to charge a power source in the battery cell;

a protection circuit module block provided between the charger IC block and the battery cell to detect an electric current charged in the battery cell and transmit information on a charging state of the battery cell to the power receiver controller;

a positive-voltage regulator block provided to supply a power source to the power receiver controller; and a power receiver controller for controlling the rectifier block, the smoothing filter block, the charger IC block, the protection circuit module block and the positive-voltage regulator block.]

[9. The wireless multi-charger system according to claim 8, wherein the power receiver controller comprises:

a power signal processor block coupled to the smoothing filter block to process a transmission signal for the data information on the power signal received from the wireless power transmission device;

a charge signal processor block coupled to the charger IC block and the protection circuit module block to process a transmission signal for the data information on the charging capacity and charging state of the battery cell;

a signal processor block for processing information on the charging capacity and data information on the native ID that are transmitted to the wireless multi-power transmission device under the control of the device controller;

a device memory unit for storing data information on the native ID, temporally storing the data information of the charging capacity and the charging state transmitted from the protection circuit module block and the charger IC block and storing the data transmitted from the wireless multi-power transmission device; and a device controller.]

[10. The wireless multi-charger system according to claim 9, wherein the main controller of the wireless multi-power transmission device controls the transmission of a native code signal for the respective charger blocks in addition to the charge power signal to the charger blocks that are on charge, wherein the device controller analyzes the native code signal for the corresponding charger block transmitted from the wireless multi-power transmission device, and wherein the device memory unit stores a data value of the native code signal for the corresponding charger block transmitted from the device controller.]

[11. The wireless multi-charger system according to claim 9, wherein the device controller controls transmission of a data value to the wireless multi-power transmission device, the data value including a voltage value of the power signal received for the received request signal from the wireless multi-power transmission device.]

*12. A wireless multi-power transmission device for detecting a foreign substance, the wireless multi-power transmission device comprising:*

*a plurality of charger blocks each of which includes a primary charging core for generating a magnetic field to perform a wireless charging operation; and*

*a main controller to:*

*initiate a standby mode at the plurality of charger blocks, wherein during the standby mode a power signal is to be transmitted via the primary charging core of each charger block of the plurality of charger blocks; and*

*convert a first charger block on which a secondary charging core of a wireless device is detected into a charge mode and convert a second charger block on which no secondary charging core of the wireless device is detected into a foreign substance detection mode in response to detecting a presence of the wireless device at both the first charger block and the second charger block.*

*13. The wireless multi-power transmission device in accordance with claim 12, wherein the main controller is to stop an operation of the second charger block during the foreign substance detection mode.*

*14. The wireless multi-power transmission device in accordance with claim 13, further comprising:*

*a reception signal processor module coupled to the plurality of charger blocks to detect a detection signal received through the primary charging core, wherein the main controller is to detect a foreign substance if the detection signal is not a normal signal.*

*15. The wireless multi-power transmission device in accordance with claim 14, wherein the reception signal processor module is to detect the detection signal according to a load modulation.*

*16. The wireless multi-power transmission device in accordance with claim 12, wherein other charger blocks on which a secondary charging core of other wireless device is positioned perform the wireless charging operation.*

*17. The wireless multi-power transmission device in accordance with claim 12, further comprising:*

*an LCD panel to display a foreign substance error in the second charger block.*

*18. The wireless multi-power transmission device in accordance with claim 13, wherein the second charger block is to be converted into a standby mode in response to detecting a removal of the device from the second charger block and an input of a re-start signal into the second charger block.*

*19. A method for detecting a foreign substance by a wireless multi-power transmission device, the method comprising:*

*generating a magnetic field to perform a wireless charging operation at a plurality of charger blocks, each of which includes a primary charging core;*

*initiating a standby mode at the plurality of charger blocks, wherein during the standby mode a power signal is to be transmitted via the primary charging core of each charger block of the plurality of charger blocks; and*

*converting a first charger block on which a secondary charging core of a wireless device is detected into a charge mode and converting a second charger block on which no secondary charging core of the wireless device is detected into a foreign substance detection mode in response to detecting a presence of the wireless device at both the first charger block and the second charger block.*

*20. The method in accordance with claim 19, further comprising:*

*stopping an operation of the second charger block during the foreign substance detection mode.*

*21. The method in accordance with claim 20, further comprising:*

*detecting a detection signal received through the primary charging core,*

*wherein a foreign substance is detected if the detection signal is not a normal signal.*

*22. The method in accordance with claim 21, wherein the detection signal is detected according to a load modulation.*

*23. The method in accordance with claim 19, wherein the wireless charging operation is performed at other charger blocks on which a secondary charging core of other wireless device is positioned.*

*24. The method in accordance with claim 19, further comprising:*

*displaying a foreign substance error in the second charger block.*

*25. The method in accordance with claim 20, wherein when the operation of the second charger block is stopped, the second charger block is in a standby mode until a restart signal is input into the second charger block.*

* * * * *